US006993751B2

(12) United States Patent
Bhansali et al.

(10) Patent No.: US 6,993,751 B2
(45) Date of Patent: Jan. 31, 2006

(54) PLACING EXCEPTION THROWING INSTRUCTIONS IN COMPILED CODE

(75) Inventors: Sanjay Bhansali, Sammamish, WA (US); Shajan Dasan, Bellevue, WA (US); Brian D. Harry, Woodinville, WA (US); Vance Palmer Morrison, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 768 days.

(21) Appl. No.: 09/855,239

(22) Filed: May 14, 2001

(65) Prior Publication Data

US 2002/0169999 A1    Nov. 14, 2002

(51) Int. Cl.
G06F 9/45    (2006.01)
(52) U.S. Cl. .................. 717/137; 717/143; 717/146
(58) Field of Classification Search ............. 717/137, 717/136, 146, 143, 140, 148, 124, 130, 131, 717/126
See application file for complete search history.

(56) References Cited

U.S. PATENT DOCUMENTS

| 5,367,685 | A | * | 11/1994 | Gosling ..................... 717/139 |
| 5,583,988 | A | * | 12/1996 | Crank et al. .................. 714/48 |
| 5,590,329 | A | * | 12/1996 | Goodnow et al. .......... 717/132 |
| 5,628,016 | A | * | 5/1997 | Kukol ........................ 717/140 |
| 5,682,535 | A | * | 10/1997 | Knudsen ..................... 717/117 |
| 5,838,978 | A | * | 11/1998 | Buzbee ....................... 717/158 |
| 5,901,308 | A | * | 5/1999 | Cohn et al. ................ 712/244 |
| 5,907,708 | A | * | 5/1999 | Hohensee et al. .......... 712/244 |
| 5,948,113 | A | * | 9/1999 | Johnson et al. ............ 717/128 |
| 5,966,535 | A | * | 10/1999 | Benedikt et al. ............ 717/147 |
| 6,119,218 | A | * | 9/2000 | Arora et al. ................ 712/207 |
| 6,131,187 | A | * | 10/2000 | Chow et al. ................ 717/118 |
| 6,247,169 | B1 | * | 6/2001 | DeLong ....................... 717/131 |
| 6,247,172 | B1 | * | 6/2001 | Dunn et al. ................ 717/134 |
| 6,282,702 | B1 | * | 8/2001 | Ungar ........................ 717/148 |
| 6,412,109 | B1 | * | 6/2002 | Ghosh ........................ 717/155 |
| 6,463,582 | B1 | * | 10/2002 | Lethin et al. ............... 717/158 |
| 6,523,172 | B1 | * | 2/2003 | Martinez-Guerra et al. . 717/143 |
| 6,618,769 | B1 | * | 9/2003 | Bracha et al. .............. 717/165 |
| 6,618,855 | B1 | * | 9/2003 | Lindholm et al. .......... 717/126 |
| 6,634,023 | B1 | * | 10/2003 | Komatsu et al. ............ 717/132 |

OTHER PUBLICATIONS

Deitel, H,M., Deitel, P.J., "C++ How to Program", Chapter 13, pp. 621-647, Prentice-Hall, Inc., 1994.
Cornell, G., Horstmann, C.S., "Core JAVA", second edition, Chapter 10, pp. 422-454 Sun Microsystems 1997.
Aho, A. V., Ullman, J.D., "Principles of Compiler Design", Chapter 11, pp. 382-405, Bell Telephone Laboratories, Inc., Third Printing, Apr. 1979.
Aho, A.V., Sethi, R. Ullman, J.D., "Compilers, Principles, Techniques and Tools", Chapter 1, pp. 1-24, Bell telephone Laboratories, Inc., Mar. 1998.

(Continued)

Primary Examiner—Tuan Dam
Assistant Examiner—Qamrun Nahar
(74) Attorney, Agent, or Firm—Klarquist Sparkman, LLP

(57) ABSTRACT

A compiler that completes compilation upon identifying unresolvable input during compilation instead of aborting compilation. This can be accomplished by inserting an exception-throwing instruction, and/or handlers in place of the unresolvable input in the compiled code output. If the section of the compiled code containing the inserted exception throwing instruction is later executed, an exception is thrown and/or handled. Compilation of code from a trusted source can be completed without inserting an exception throwing instruction when the code has only suspected but unverifiable problems.

37 Claims, 17 Drawing Sheets

OTHER PUBLICATIONS

Ishizaki et al., "Design, Implementation and Evaluation of Optimizations in a Just-In-Time Compiler", IBM Tokyo Research Laboratory, 1999.

Cierniak, M., et al. "Practicing JUDO:Java™ Under Dynamic Optimizations", 2000.

"Programmer's Journal", vol. 9.3, May/Jun. 1991.

Suganuma, T., et al., "Overview of the IBM Java Just-In-Time Compiler", IBM Systems Journal, vol. 39, No. 1, 2000.

Matsuoka & Itou, "Is Java Suitable for Portable High-Performance Computing?", Dept. of Mathematical and Computing Sciences, Tokyo Institute of Technology.

Kim, Jin-Soo et al., "Memory System Behavior of Java Programs: Methodology and Analysis", Sigmetrics 2000.

Yang, Byung-Sun, et al., "LaTTe: A Java VM Just-in-Time Compiler with Fast and Efficient Register Allocation", IBM T.J. Watson Research Center.

Lee, S., et al., "Efficient Java Exception Handling in Just-in-Time Compilation", Java 2000.

Book entitled Compiler Desigh authored by Reinhard Wilhelm and Dieter Maurer and published by Addison-Wesley Publishing Company in 1995. Chapter 6 entitled *The Structure of Compilers*, pp. 221-233.

Book entitled Compiler Design authored by Reinhard Wilhelm and Dieter Maurer and published by Addison-Wesley Publishing Company in 1995. Chapter 7 entitled *Lexical Analysis*, pp. 235-263.

Book entitled Compiler Design authored by Reinhard Wilhelm and Dieter Maurer and published by Addison-Wesley Publishing Company in 1995. Chapter 8 entitled *Syntax Analysis*, pp. 265-383.

Book entitled Compiler Design authored by Reinhard Wilhelm and Dieter Maurer and published by Addison-Wesley Publishing Company in 1995. Chapter 9 entitled *Semantic Analysis*, pp. 385-456.

* cited by examiner

```
         method ComputeTaxBasedOnIncome(var real X)
         //This method computes taxes based on ordinary income.
512──▶ *4982GYT
         {      var real y, z;

if (X < 30000)      //case 1

//For ordinary income under $30,000, the tax is 10%
511──▶ *4983GYT
                z:= (0.10*X);

else if (X < 50000)   //case 2

//For ordinary income greater than $30,000 and less
                //than $50,000, the tax is 12%.
510──▶ *4984GYT
                z:= (0.12*X);

else if (X< 100000)   //case 3

//For ordinary income greater than $50,000 and less
                //than $100,000, the tax is 14%.
509──▶ *4985GYT
                z:= (0.14*X);

else if (X< 200000)   //case 4

//For ordinary income greater than $100,000 and less
                //than $200,000, the tax is 16%.
508──▶ *4986GYT
                z:= (0.16*X);

else                //case 5

//For ordinary income greater than $200,000 the tax is
                //16% on the first $200,000 and 18% on any amount in
                //excess of $200,000.
507──▶ *4987GYT
                y := (200000*0.16);
501──▶ z:= (y + (X-200000)*0.18);

//The tax has been computed and now is returned.
            return (z);
         }
```

FIG. 8

```
Method (x var)          ← 801
{
    xxxxxx
    xxxxxx
    xxxxxx
    bad code
    xxxxxx
    xxxxxx
}
```

Fig. 12

(Input File or Stream)
//This program creates a ...

\*Source: XYZ Programming Industries ◄── 1201
\*Server: XYZ.com ◄── 1204
\*Certification: 37698JI, 43029XN, 83621TY ◄── 1205
\*Unresolvable Code:
    \*default = basic block, method ◄── 1206
1207     \*special: links = instruction ◄── 1210
    \*source: local = local.dll, remote = xyz.com/ouch.dll
                  1209                            1208 include xyz.com/dev/classA2.dll ◄── 1203
xxxxxxxxxxxxxxx
xxxxxxxxxxxxxxx
xxxxxxxxxxxxxxx
xxxxxxxxxxxxxxx
xxxxxxxxxxxxxxx
xxxxxxxxxxxxxxx
xxxxxxxxxxxxxxx
xxxxxxxxxxxxxxx ◄── 1202
xxxxxxxxxxxxxxx
xxxxxxxxxxxxxxx
xxxxxxxxxxxxxxx
xxxxxxxxxxxxxxx
xxxxxxxxxxxxxxx
xxxxxxxxxxxxxxx For all Figures:
'\*' = metadata
'//' = comments
'#' = translation time link

PLACING EXCEPTION THROWING INSTRUCTIONS IN COMPILED CODE

TECHNICAL FIELD

The present invention relates to compilers, and more particularly, the handling of compilation exceptions.

BACKGROUND AND SUMMARY

In general, compilers translate human readable source code into machine readable object code in preparation for execution. A compiler is designed to receive human readable source code in an expected format. When the source code is written in a format not expected by the compiler, then compilation aborts and an exception is generated to identify the unexpected format. There are many causes of compilation errors known in the art. If compilation aborts, the object code is not available to be executed.

Traditionally, source code is compiled during the software development stage when software developers are still present to repair any errors in the program. Once the errors are repaired, the source code is compiled into object code (also known as native code or machine code) for a target platform and tested. After testing, the object code can be utilized by any compatible system. Software developers often develop object code for different systems and platforms.

A number of terms are commonly used in the computer arts to describe the process of transforming a computer program into a machine usable format. The following terms present a broad and general overview of the methods known in the arts to perform this transformation.

Compilers High level language compilers take human readable source code and translate it into machine readable object code. Traditionally, compilation of the entire program was completed before any portion of the program was executed. A compiler often takes human readable source code as input and creates machine executable code.

Interpreters. Generally, an interpreter is a program that translates a program from one language to another and then typically a short time thereafter executes the translated code. In some cases the code translated by the interpreter is not cached (or saved in memory). In those cases, if an already executed section of code needs to be executed again, it must be reinterpreted.

Virtual Machines. The term virtual machine carries several meanings. Virtual machine is used to describe a runtime computing environment that enables a program to run in a computing environment other than the computing environment for which the program was originally designed. For example, a 32-bit operating system server could present a runtime virtual machine environment to run non-native 16-bit applications. The term virtual machine is also used to describe the Java run-time environment. The Java run-time environment is based on an earlier model language called UCSD Pascal. UCSD Pascal takes Pascal source code and translates it into an intermediate language code that can be further interpreted (translated) at run-time into object code and executed in the native environment. The intermediate language code is usable by any computer with an interpreter capable of translating the intermediate language code into a native object code. Such an interpreter is often called a virtual machine.

Just-in-time (JIT) Compilers. Just like a traditional compiler, a JIT compiler translates a program from a first language to a second language. However, a JIT compiler often delays the translation until the section or method of the program in the first language is needed for execution in a second language. The decision of exactly when to translate a section of code from a first language into a second language may vary broadly. Preferably, the code will be translated in time for it to be consumed by the program or processor expecting code in the second language.

The term JIT compiler is generally used in the context of a two phase translation process. The first phase of translation starts with an initial language representation and translates it into an intermediate language representation. The second phase of translation starts with an intermediate language representation and translates it into a subsequent language representation. Often, the JIT compiler is associated with the second phase of translation where the intermediate language code is translated into a more machine friendly language representation. If the machine friendly language representation is object code, then the object code will be used directly by the processor. However, if the output of the JIT compiler is an intermediate language code, then it must be further translated (e.g., by a virtual machine or an interpreter) before it can be utilized by the native system. Often, JIT compilers translate intermediate language code into native code once, and then store (or cache) the translated code in case sections of code are run multiple times.

Translators. A translator is generally a program that translates a program from one language into another. The second language representation of the program can be either an intermediate language or machine code. Translation is generally utilized in order to transform a program along the spectrum from a more human readable format into a more machine friendly format. For this specification, compilers, JIT compilers, translators, interpreters, assemblers, virtual machines and any other automated program and or process that translates from a first language representation to a second language representation will be called a translator.

The process of translation is typically so complex that it is often logically (and potentially physically) broken down into a series of sub-units. A partial list of such logical sub-units would include lexical analysis, syntactical analysis, intermediate code creation, code optimization, code generation, table management, type checking, code verification and error handling. A more complete enumeration of the potential translation sub-units are well known in the arts. For each of the potential sub-units employed to translate a program from a first language (e.g., source code or intermediate code) to a second language (e.g., intermediate code, object code, or interpretable code), something can go wrong with the process. When a sub-unit of translation aborts translation because it is unable to resolve the meaning of an instruction(s), then that instruction is deemed an unresolvable instruction(s) (or unresolvable code). (See below Unresolvable Translation Errors). If the translator is unable to resolve the translation in a meaningful or unambiguous way, then translation aborts.

For many reasons including interoperability and security, intermediate language code has been gaining popularity. Intermediate language code is a representation of a program that was translated from an initial language code representation of the program. Further, the intermediate language code representation of the program will be translated into a subsequent language code representation of the program some time before the program is executed. Often, source code is translated into an intermediate language code in a first translation. This intermediate language code is then translated into a native object code in a second translation. The first and second translation can occur on the same or different computers. Potentially, a program may be translated into different intermediate language code representations in multiple successive intermediate phases of representation. Any computer that has a translator capable of translating any phase of intermediate language code into a utilizable subsequent language code, can use the functionality of the program represented by the intermediate language code.

Developers can author a source code program once, translate it into intermediate language code and distribute it to any platform with an intermediate language code translator. A universal intermediate language code is efficient since it is easier for each computer to support one or two (or a few) intermediate language code translators than to support multiple different (traditional) source code compilers. Further, by the time a program reaches an intermediate language code phase, much of the difficult or time consuming analysis may already have been computed by a prior translating phase, thereby reducing the workload for a subsequent translator.

However, multiple stage translation creates a potential new set of problems. In subsequent translations, if a next translator throws a translation exception, the source code developers may no longer be present to fix any translation errors. So if the intermediate language translator aborts translation, the program represented by the intermediate language code will not be usable. The intermediate language code is useless even if the section of unresolvable instruction(s) that caused the translation to abort would never have been executed in a specific case after translation. It is not unusual for large portions of a computer program to not be executed during any individual execution case.

SUMMARY OF THE INVENTION

The present invention relates to completing translation when unresolvable input code is encountered during translation instead of aborting. This can be accomplished by inserting an exception-throwing instruction(s) (and/or handling instruction(s)) in the output code where the unresolvable input code would have been placed in the output code had it been translatable. In such an embodiment, upon encountering an unresolvable instruction(s) in the input code, the translator continues translation and places an exception throwing instruction in the output code. Such an inserted exception-throwing instruction will be thrown if it is ever executed.

This specification discusses three general kinds of input instructions or code: translatable instruction(s) (or code), unresolvable instruction(s) (or code), and suspect instruction(s) (or code). Translatable instructions are translated accordingly into the output code. Unresolvable instructions are not translated since their intended meaning is not known, so they are instead converted into an exception-throwing instruction(s) (and/or handling instructions) and inserted or placed into the output code. This insertion or replacement of unresolvable code with other instructions is also called replacing. A suspect instruction(s) is input code that is literally translatable, but for some other reason, remains ambiguous to the translator. A trivial example suspect code is an instruction that is syntactically correct but contains an assignment to a variable that can not be safely type checked.

In one embodiment, the translator will translate the suspect instruction into the ambiguous meaning in the output code, provided the suspect instruction is from a trusted source. In such an embodiment, if the instruction is not from a trusted source, the suspect instruction will be replaced with an exception-throwing instruction (and/or handling instruction) in the output code.

In an embodiment, the exception-throwing instruction (and/or handling instruction) can be inserted in the output code in a number of potential locations. The instruction can be inserted in place or in front of the unresolvable instruction(s) itself, the basic block, a procedure, a method, an object, or a module containing the unresolvable instruction(s), or in place of or in front of a call or branch to a procedure, method, object or module containing the unresolvable instruction(s). Further, the instruction(s) can be inserted in place of or in front of a (translation-time or run-time) call to a linked local or remote server or library containing an unresolvable instruction(s). Further, the instruction can be inserted anywhere in the execution path at or in front of where the unresolvable instruction would appear had it been translatable. Finally, a new basic block containing exception-throwing and/or handling instructions can be inserted in the translated code, with control flow directed to the new basic block in the event the execution path would otherwise reach an unresolvable instruction(s) or other untranslatable condition(s).

In another embodiment, the translator does not abort translation when it reaches a basic block containing an unresolvable instruction(s). Instead, the translator inserts an exception-throwing instruction(s) (and/or handling instruction(s)) as the first instruction in a basic block in the translated code. The exception is thrown if and when that basic block is ever executed.

In another embodiment, the translator will translate the suspected code without placing an exception-throwing instruction (and/or handling instruction) in the translated code, so long as the suspected code is within a defined class of suspected code. For example, one defined class of suspected code is defined as code that is suspected based on an inability to prove the type safety of the code in cases when the suspected code is from a trusted source (e.g., software developer, vendor, etc.).

In another embodiment, metadata in the input file identifies the input source. The translator considers the source of the input stream as described or identified in the metadata in order to determine whether to eliminate an exception-throwing instruction(s) (and/or handling instruction(s)) that would otherwise be inserted because the translator (for example) is unable to type check.

In one embodiment, metadata in the input stream recommends the level (e.g., method level, instruction level, basic block level, new basic block, etc.), into which exception-throwing instruction(s) should be inserted in the output stream.

In another embodiment, a standard exception (e.g., x86) is inserted for all cases when an exception-throwing instruction(s) (and/or handling instruction(s)) is inserted in the translated code. In another embodiment, metadata in the input file recommends potential classes of exception-throwing instruction(s) (and/or handling instruction(s)) to insert in the translated code. In another embodiment, metadata recommends an exception handling routine to handle an inserted exception when it is thrown. Such an embodiment considers the recommended classes of exception handlers to insert in the output stream. In another embodiment, metadata suggests exception handlers for corresponding areas (instructions, basic block, procedure, object, . . . ) of the input stream for cases when unresolvable instruction(s) is encountered in such areas.

In another embodiment, an unaltered copy of the unresolvable code is included in the output stream with the inserted exception throwing instructions (and/or handling instruction(s)), and a second run-time attempt is made to translate the unresolvable code. At run-time, if the unresolvable code is translated, then the resulting translation will be executed. If the unresolvable code remains untranslatable, then the inserted exception throwing instruction (and/or handling instruction) will be executed.

The illustrated embodiment completes compilation in spite of the unresolvable code by placing an exception-throwing instruction(s) (and/or handling instruction(s)) in the object code or intermediate language code output stream. If the program section containing the exception throwing instruction(s) is later executed, the exception gets thrown. How that exception is handled will depend on the exception handling implemented and whether or not the input stream contained metadata describing potential exception throwing instructions or exception handlers. Further, whether or not an embodiment converted any such input file metadata into corresponding exception throwing instructions or exception handling instructions in the output file. An embodiment may or may not take into consideration any recommendations contained in metadata of the intermediate language code input file. Further, an embodiment may or may not contain metadata describing potential exceptions or exception handlers in the input file.

Finally, unresolvable translation errors are not limited to unresolvable instructions. They can be any condition in the input stream that a translator determines requires exception-throwing and/or handling instruction(s) in the output stream.

In any such embodiment, the inserted or placed exception throwing instruction(s) (and/or handling instructions) may be instances of exception (and/or handling) objects selected from a class library. Further, all such embodiments may be linked at translation-time or run-time, dynamically or statically, and either locally or remotely.

Additional features and advantages will be made apparent from the following detailed description of the illustrated embodiment that proceeds with reference to the accompanying drawings.

BRIEF DESCRIPTION OF THE DRAWINGS

FIG. 5 is a program listing of an exemplary input method containing unresolvable code.

FIG. 8 is a program listing depicting potential placement of exception throwing instructions for methods or for methods without multiple basic blocks.

FIG. 12 is a diagram depicting an Input File or Stream.

DETAILED DESCRIPTION

Translators

Figure 1:
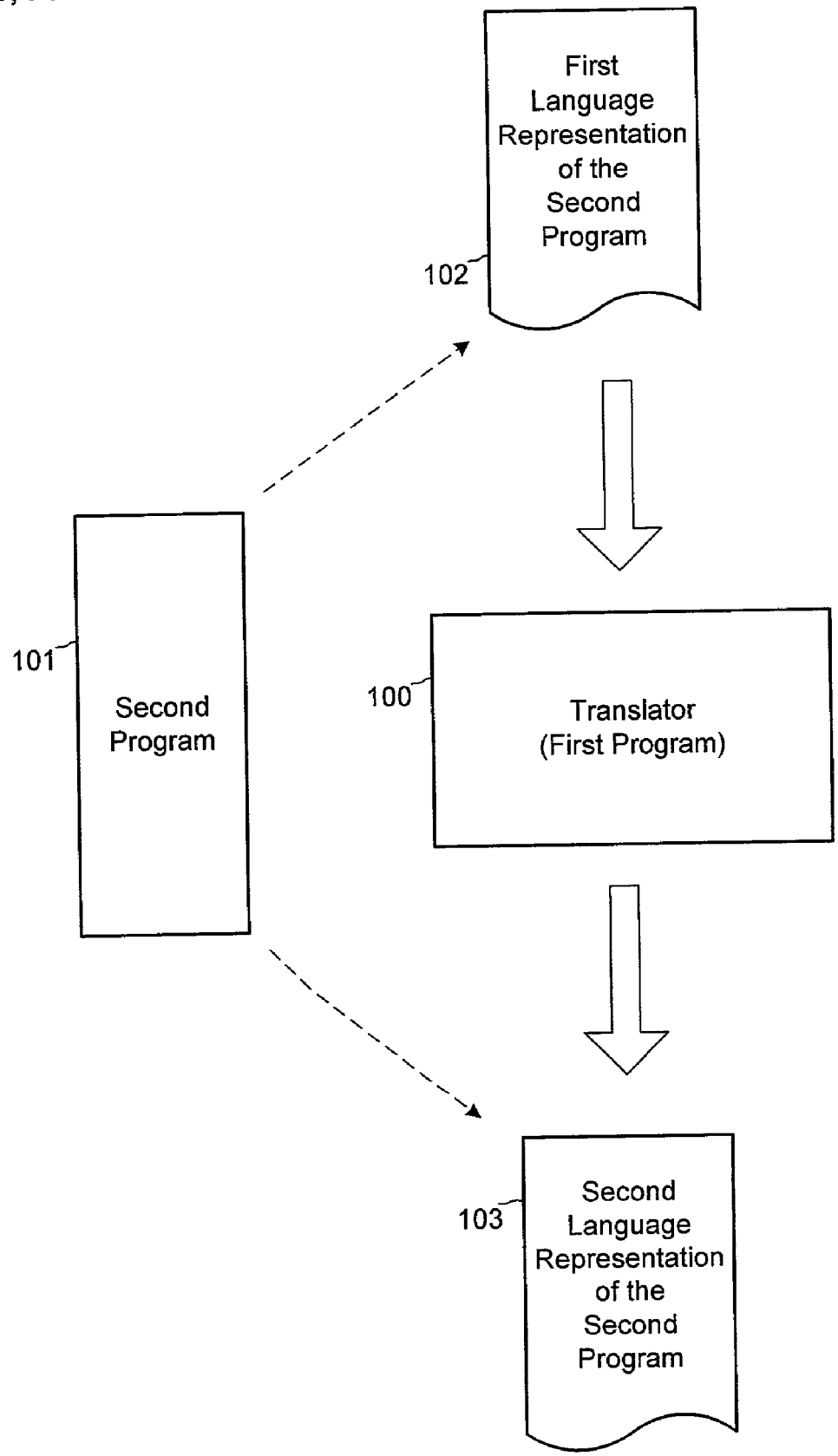
FIG. 1 is a prior art data flow diagram depicting a program being translated into a second language.

Generally, as shown in FIG. 1, a translator is a first program 100 that takes a second program 101 written in a first language 102 as input and creates a second language representation of the second program 103 as output. If the first language is a high level language such as C, C++, Smalltalk, or Ada (source code), and the second language is a machine readable code or assembly language code, then the translator is called a compiler.

Other translators convert from one language to another language called an intermediate language. Often intermediate language code can be directly executed by a computer by using a program called an interpreter. Other times the intermediate language is further reduced to object code before being executed. Some high level compilers use assembly language code for an intermediate language. Assembly language code is generally a low level language code where each instruction corresponds to a single machine instruction. Assemblers are programs that translate assembly language code into machine code. In general, object code is code that is directly usable by the machine.

For this specification, compilers, JIT compilers, translators, interpreters, assemblers, virtual machines and any other programs that translates from a first language to a second language will be called translators. These translators are defined as such whether they represent a single translation before execution, or one of multiple translations that occur before execution. Further, compilation and compiling, translation and translating, interpretation and interpreting, and assembly and assembling will be called translation or translating. Given such definitions, a translator translates from source code to intermediate code, from intermediate code to object code, from an initial intermediate language code into a subsequent intermediate language code, or from source code to object code. The process would be called translation or translating, and upon completion of translation, the resulting code would be called translated code, output stream, or output file. Since the invention applies to all these forms of translation, we use translation in this general sense.

Generally, translators 100 are designed to recognize a file of code in a first language (input file or input stream) 102 and convert it to a file of code in a second language (output file or output stream) 103. When any portion of the input file in the first language is untranslatable for any reason, historically the translator halts and the translation fails to create the output file in the second language. Often, the translator notifies the user of the failed translation attempt and enumerates the lines of code containing the unresolvable translation errors.

Unresolvable Translation Errors

Figure 2:
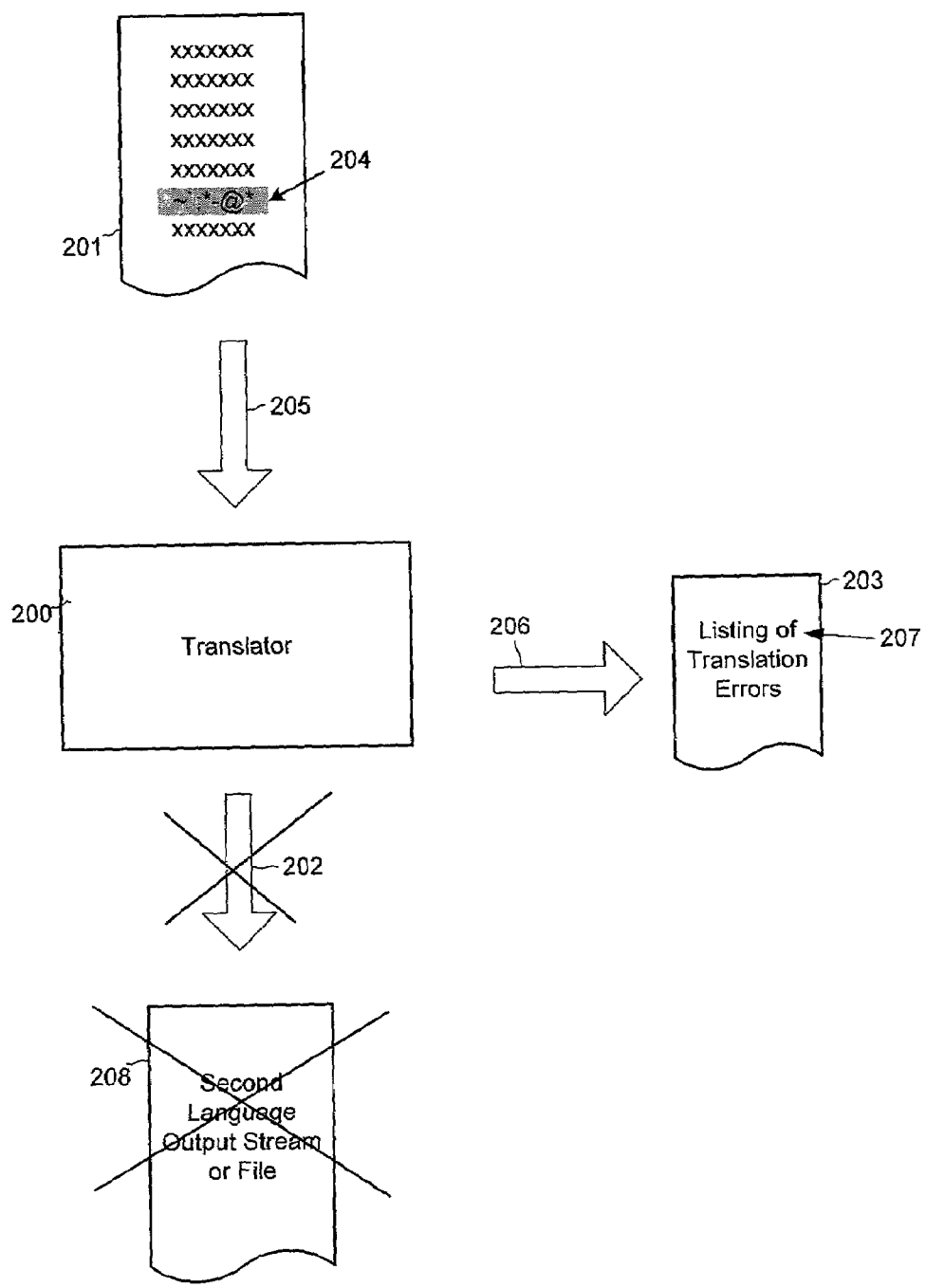
FIG. 2 is a prior art data flow diagram depicting a failed and aborted translation and a listing of translation errors.

As shown in FIG. 2, what all these translators 200 have in common is a potential for identifying instructions, data, or objects 204 in the input stream (in this specification "input file" has the same effective meaning as "input stream" and "output file" has the same effective meaning as "output stream") of the first language that for one reason or another the translator is unable to unambiguously, meaningfully, or safely translate into corresponding instructions, data, or objects in the second language 202, 208. In such a case, the translator typically will abort translation and deliver a message 206 to an output device (screen, file or printer) 203 identifying the source of the unresolvable instruction(s), data, or objects in the input stream 204.

The types of translation errors encountered are quite diverse and are discussed in the prior art. Historically, because compile-time always preceded run-time, these errors were called compilation errors. More generally, anytime a translator is unable to unambiguously, meaningfully, or safely translate a portion of code in a program represented in a first language into a program represented in a second language, it is called "unresolvable code," "unresolvable translation errors," "translation errors" or "bad code." Such unresolvable translation errors are not limited. They can be any condition in the input stream that a translator determines requires exception-throwing and/or handling instruction(s) in the output stream.

When such unresolvable code 204 is encountered in the input stream of the first language code during translation, a translation error message is generated and delivered to an output device 203. Often the translation will continue and the translator will generate a list of translation errors to the output device 207. This will allow multiple errors to be fixed by the software developer before attempting translation again.

The number and kinds of translation errors that exist in the automated computer language translation arts (e.g., compilers, interpreters, translators, interpreters, virtual machines, assemblers, linkers, and etc) are very diverse. The following errors only illustrate a potential sub-set of the universe of errors that can occur during translation, and the term "translation error" shall encompass the broader meaning. A more diverse understanding of compiler, translator, interpreter, assembler, or virtual machine translation errors are known in the computer arts. See Alfred V. Aho, *Compilers, Principles, Techniques, and Tools* Addison-Wesley Publishing Co., 1986, and see Reinhard Wilhelm, *Compiler Design*, Addison-Wesley Publishing Co., 1995.

Figure 3:
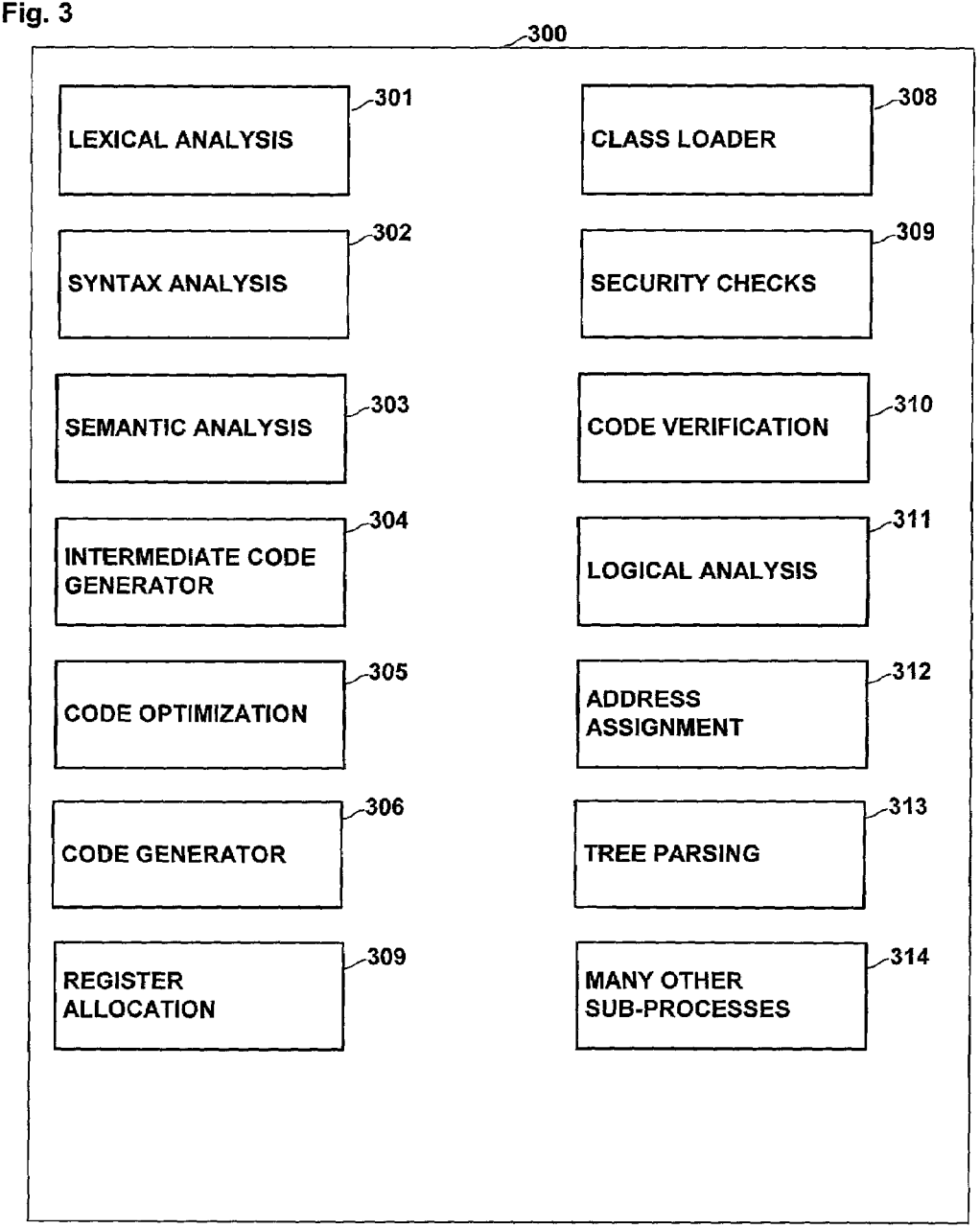
FIG. 3 is a block diagram depicting a translator process containing a partial universe of logical translation sub-units.

Translation errors can arise during any of the logical sub-units of translation. In the example translator 300 shown in FIG. 3, a partial list of the potential logical sub-units is depicted 301–314. Every translator will have a potentially different list of such logical sub-units, and many translators will have different names for sub-units performing similar functions. During translation at any one of these logical sub-units, a translation error can be generated.

A syntax translation error can occur during syntax analysis 302 when a semi-colon is missing from the end of a statement, or an arithmetic expression is missing one or more parenthesis. A semantic translation error can occur during semantic analysis 303 when an arithmetic operand is applied to a textual token, or an integer is assigned to an identifier defined to point to a data structure object. A lexical translation error can occur during lexical analysis 301 when a keyword is misspelled, or when an undefined identifier is referenced. A logical translation error can occur during logical analysis 311 by an overlooked design failure. An input stream translation error can be caused by a degradation of the signal evidenced by dropped bits in the input stream thereby making the input stream unrecognizable. A code verifier translation error can occur during verifier analysis 310 when the translator is unable to meaningfully resolve a portion of the input code. See below "Code Verification." A type check translation error can occur when a real number variable is assigned as an array index.

When one or more translation errors occur during translation, the instruction(s) or section of code that the translator is unable to translate is called bad code, unresolvable code, or unresolvable translation errors.

Typically, when a translator (or any sub-unit of translation) encounters unresolvable code, the translation process may continue for the purposes of pointing out other unresolvable code further along in the input stream. By identifying multiple errors in the input file, the software developer can solve multiple problems before attempting to translate the program again. However, as shown in FIG. 2, an output file containing the program represented in the second language is not returned for execution 208. In a failed translation attempt, the output from the translator is more generally limited to a listing and possible description of the translation errors 203, 207.

Figure 4:
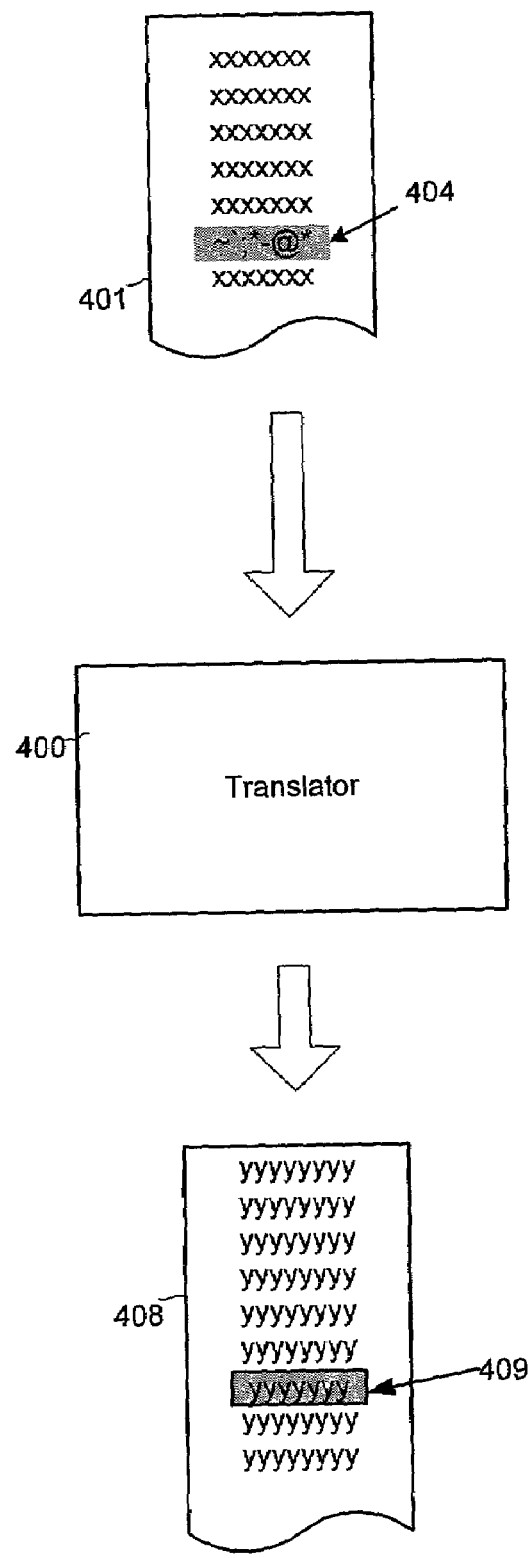
FIG. 4 is a data flow diagram depicting a continued translation upon identifying an unresolvable input and a resulting output containing an exception throwing instruction.

In one embodiment of the invention, as shown in FIG. 4, the translation continues upon identifying unresolvable code 404 and an output stream (or file) containing the translated code is generated 408, and an exception-throwing instruction is placed in the output stream in place of the unresolvable code 409. In another embodiment, the exception-throwing instruction can be placed in the second language output stream in place of unresolvable code whether that second language output stream is (i) the output stream of the first translation in a series of N translations, (ii) the last translation in a series of N translations, or (iii) any translation in the series of translations one through N, where N is greater than or equal to one.

Placing Exception-Throwing Instructions in Compiled Code

In one embodiment of the invention, a program represented in a first language 401 is translated into a representation of the program in the second language 408 even though a portion of the code is unresolvable 404. The unresolvable portion and potentially other instructions in the vicinity of the unresolvable portion is replaced with exception throwing instruction(s) 409. In the event these exception-throwing instructions are ever executed, the exception will be thrown.

Such an embodiment allows the completion of translation from a first language to a second language 408. Further, it is not unreasonable to expect that unresolvable code replaced with an exception-throwing instruction, may never be executed. In such an embodiment, the exception will only be thrown if and when the instruction(s) that replaced (or was inserted in front of) the unresolvable code is executed. Since the translation of the program is completed from the first language to the second language in this embodiment, the program is available in the second language code for utilization (e.g., execution, translation, interpretation, compilation, JIT compilation, assembly).

There are many cases where it may be beneficial to complete translation from a first language into a second language, where the second language contains an inserted exception throwing instruction in the translated code rather than simply aborting translation and producing a list of translation errors. For example, often a software developer is using third party class files that contain enumerated classes along with an interface definition for utilizing such classes. It is not unusual in linking the software developers code to such class libraries for a translation error to be encountered. However, often the software developer does not have the source code for the class libraries and is subsequently unable to complete translation to obtain executable code. Software developers may prefer to complete the translation and obtain translated code containing exception-throwing instruction(s) so that portions of the software design can be tested.

Another example of when a completed translation may be desirable is in the Internet environment. Often, intermediate language code is delivered over the network with the expectation that it will be translated from a platform neutral language (first language) into a platform specific language (second language) for utilization on the local computer. In such a case, if the translation is completed in spite of unresolvable code, the local computer can utilize the translated code and will only execute the exception-throwing instruction if and when the program section that once contained an unresolvable instruction is executed. Allowing translation in such a network environment is helpful since it is more likely that the intermediate language code (first language input stream) will not generally be as human friendly. In such a case, the unresolveable code is more difficult to spot, more difficult to repair, and it is more likely that a typical Internet user will be unable to discover and repair (debug) the unresolvable code in the intermediate language code input stream.

Another example is an instruction in the first language code that requests a link to a resource from which some portion of the program being translated will request services or seek definition. If the translation-time link can not be made for any reason (e.g., link path is wrong, link no longer exists, network path is down, link server down, etc.), then an embodiment of the invention places an exception-throwing instruction in the place of the instruction requesting the linked resource. The link can be a translation-time link, linking executable modules into the second language output stream, or a run-time link, linking the executing output stream to a dynamically linkable local or remote library of executable modules. In such a case, the link often facilitates services that will not be utilized in every case of output stream execution, and creating the translated code containing the exception throwing instruction (and/or handling instruction(s)) in place of the unresolvable instruction(s) may be a viable alternative to a translation failure.

Further, in another embodiment, if the requested link is to (or the input stream containing the requested link is from) a known or trusted source, then the requested link can be translated into the second language output stream without placing an exception-throwing instruction in the output stream. In that case, the unverifiable link is translated without further limitation. (Identifying trusted sources is discussed below in "Metadata and Security.")

Also, if the link can not be made at translation-time, executable handling instructions can be placed in the output stream to try linking again at run-time.

JIT Translators

For purposes of illustration, and not to limit the scope of the invention, a sub-set of the potential universe of problems addressed by an enumerated embodiment are considered. This sub-set considered is program inconsistencies caused by translator implementation version dependency In the JIT compiler (or translator) context, the intermediate code is often translated only moments before it is executed. Varying how far in advance intermediate language code is translated into object code by a JIT translator, will have an effect on whether and when translation errors are generated. Since generally a program that manifests an unexpected or unpredictable result is undesirable, it would be preferable to reduce such uncertainty. The following examples show how an illustrated embodiment would reduce uncertainty in the context of JIT translators.

A first translator version implementation waits until the very last instant to translate the intermediate code. In that case, it only attempts to translate code that will later be executed. In this first translator, there is no risk of unnecessary translation failure, because only needed code is translated. The translation error was inevitable. However, a later translator version implementation may translate further in advance whenever a CPU has available time slices. If the later translator version implementation attempts to translate a section of unresolvable code that is not later executed, then translation aborts, even though the section containing the unresolvable code never would have been executed. Since the first translator completed execution while the second translator aborted translation, the program behavior may vary based on the version of the translator implementation. Thus, program behavior will be inconsistent and unpredictable. This uncertainty can be reduced with an illustrated embodiment.

In an embodiment, regardless of how far in advance the intermediate language code is translated, an exception throwing instruction is placed in the output stream in response to identifying the unresolvable instruction(s). In such an embodiment, an exception is thrown predictably only if and when the inserted exception-throwing instruction(s) is actually executed. This reduces the unpredictability based on the translator version implementation.

Another form of uncertainty that can be addressed is the uncertainty created by variations in the level of "intelligence" of translator implementations. The program behavior may vary based on the level of intelligence (or foresight) of the designers of a given translator version implementation. This can be illustrated using the following section of code.

if (x=true) then
  "execute unresolvable code"

A smart translator may determine that the Boolean variable "x" will always be false and thus the unresolvable code will never get executed. Since the unresolvable code will never be executed, a smart translator discards (or ignores) the unresolvable code and translates the balance of the program. However, a not-so-smart translator may fail to make this determination and will abort translation upon encountering the unresolvable code. The smart translator creates object code and the not-so-smart translator aborts translation upon identifying the unresolvable code. Thus, program behavior is inconsistent and unpredictable based on the translator version implementation.

In an embodiment, regardless of the smartness of a translator, an exception throwing instruction(s) is placed in the output stream in response to identifying the unresolvable code. In such a case, the runtime behavior of the translated code does not change. Whether a smart translator version implementation ignores the code, or a not-so-smart translator version implementation generates an exception throwing instruction(s), since the code never gets executed, the execution behavior is predictable. In such an embodiment, an exception is thrown predictably and only if and when the inserted exception-throwing instruction(s) is actually executed. Such an illustrated embodiment reduces uncertainty created by translator version implementation.

Another inconsistency addressed by an illustrated embodiment is in the context of pre-JIT. A pre-JIT occurs when large portions (or all) of an input stream is translated in advance. For example, if a first version translator implementation decides to pre-JIT the entire intermediate language code input file before executing any portion thereof, then the entire program translation may be aborted just because one method or section contains unresolvable instruction(s). Given such a first version implementation, the aborted program is unavailable even in cases when the section(s) of unresolvable code would never have been executed in a given execution case. If a second version translator implementation followed a more conventional JIT strategy, the second version implementation would not attempt to translate the section or method containing the unresolvable code, would complete translation of the program, and would make translated code available for execution. Thus, the first version would abort translation, and the second version would make translated code available for execution.

In the illustrated embodiment, regardless of when the input stream is translated, an exception throwing instruction is placed in the output stream in response to identifying the unresolvable code. In such an embodiment, an exception is thrown predictably and only if and when the inserted exception-throwing instruction(s) is actually executed. This reduces uncertainty based on translator implementation version dependency.

In another example, two translators version implementations may vary when and if portions of a program (input stream) are translated in a multi-threaded environment. The program behavior caused by aborting compilation while attempting to translate unresolvable instruction(s) in a multi-threaded environment can vary greatly. One portion of the program may already have run or be running when the translator begins translating a section containing unresolvable code. Translation aborts upon identifying the unresolvable code. If the section (instruction(s)) causing translation abortion never would have been executed in the given execution path, the run-time behavior of the program would be inconsistent based on the translator version implementation. Thus, run-time behavior depends on which translator is implemented.

The illustrated embodiments present more predictable behavior in the multi-threaded environment. Even if the same translator is used, a program may behave differently in different runs of the program. Inconsistencies in a run-time behavior is undesirable. Multithreading is complex already without throwing JIT-compilation errors. The complexity of aborting a JIT-compiler can be reduced by placing an exception throwing or handling instruction in an executable output stream. The exception is then only thrown if and when that section of code is actually executed. If the section of code is execute, the inserted exception is thrown. This is much more predictable behavior and much more simple to diagnose than if the JIT-compiler throws an exception.

The illustrated embodiments present the potential for creating more predictable runtime behavior for the illustrated problems—multi-threaded environments, version dependency, conditional exceptions, and pre-JIT failure. All four of these problems may have more predictable program behavior since the program behavior is predicated not upon whether and when an attempt is made to translate unresolvable code, but upon whether and when an exception throwing instruction inserted in response to the unresolvable code is later executed. Only at the moment of executing the inserted exception-throwing instruction(s) will the exception be thrown. This allows translation to complete, and the exception inserted in place of the unresolvable code will only be thrown, if the inserted instruction(s) is executed (or utilized). Exceptions are thrown at runtime instead of translation time, and only when the inserted exception is actually in the execution path.

Identifying Areas of Code Blocked by Exception-Throwing Instructions

When a section of code in a first language contains unresolvable code, an embodiment may determine whether any of the code surrounding the unresolvable code should not be executed.

Assume that a program exists in a first language and is being translated into a second language. Further, as shown in FIG. 5, assume the entire program is translatable into the second language except one line of unresolvable code 501 contained within one part of a method 500.

The unresolvable code in this procedure is the letter 'o' contained in the arithmetic expression "z:=(y+(X−20o000) *0.18)." In this example, since most people make less than $200,000 per year, the procedure arguably has some limited function. The first four cases will compute the taxes based on income, and only the fifth case contains (a trivial example of) unresolvable code.

This example is only for illustrative purposes and the fact that in this case the first language is represented in a human readable form is not intended to be limiting. If the first language was represented (for example) in a less human friendly intermediate language code, then it would not be so apparent how to fix the simple error (e.g., change 'o' to '0'). Further, if the first language were represented in an intermediate language code that had been received by the translating environment from over the network, humans encountering a translation error in the translating environment would not likely have a copy of the original source code (the source code in which the program was originally written) to fix the input stream.

In an embodiment where the translator inserts an exception-throwing instruction in place of or in front of unresolvable code, a translator may determine where to place (or insert) the exception-throwing instruction.

The following levels are for illustration purposes only and are not intended to limit the potential levels or placement of exception-throwing instructions. Further, it is understood that FIG. 5 is the input stream containing unresolvable code 501, and the output stream containing an exception throwing instruction at either the instruction level, method level, or basic block level would appear in significantly different form since it would be in a second language format (likely an intermediate language or machine language depending on a given translator). However, the identification of the instruction level, the basic block level, and the method level in the input stream is informative since these levels often maintain the same logical relations in the second language output stream even though they will potentially take on a significantly different appearance.

Method Level. One embodiment inserts the exception-throwing instruction(s) at the method level (e.g., method, procedure, function, class, class method, object, data structure, interface, etc.) 502. In that case anytime the method is called (executed, instantiated, initialized, etc.) from anywhere in the program, the exception throwing instruction is executed, and no part of the method is executed. In other cases, the translator may determine that even though the method (etc.) in general is unsafe, a particular invocation of the method is safe. In such a case, the translator may create a safe instance of the method in the output stream whenever the safe invocation is called, while placing an exception throwing instruction in the actual method.

Figure 6:
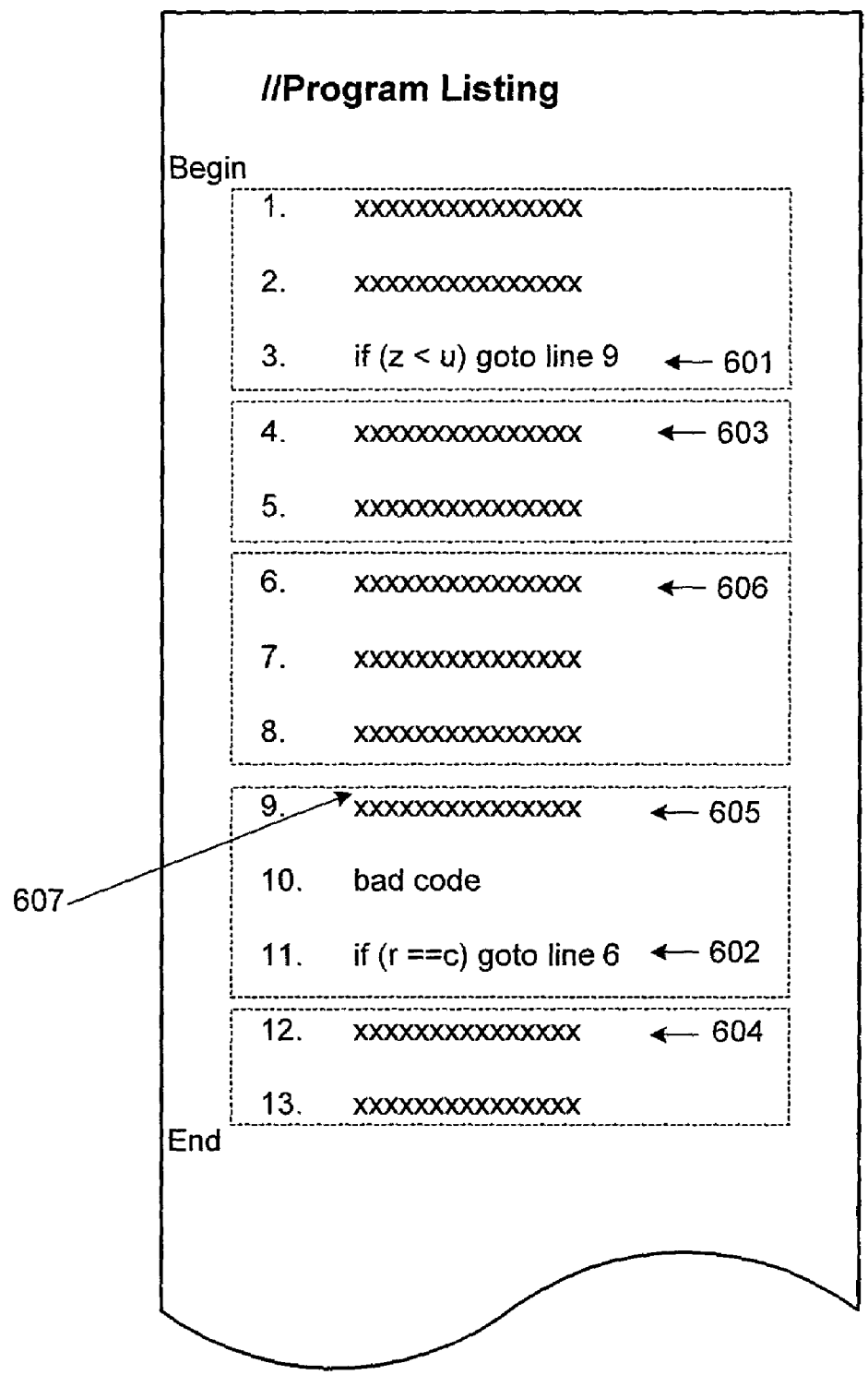
FIG. 6 is a program listing depicting basic block identification.
Figure 7:
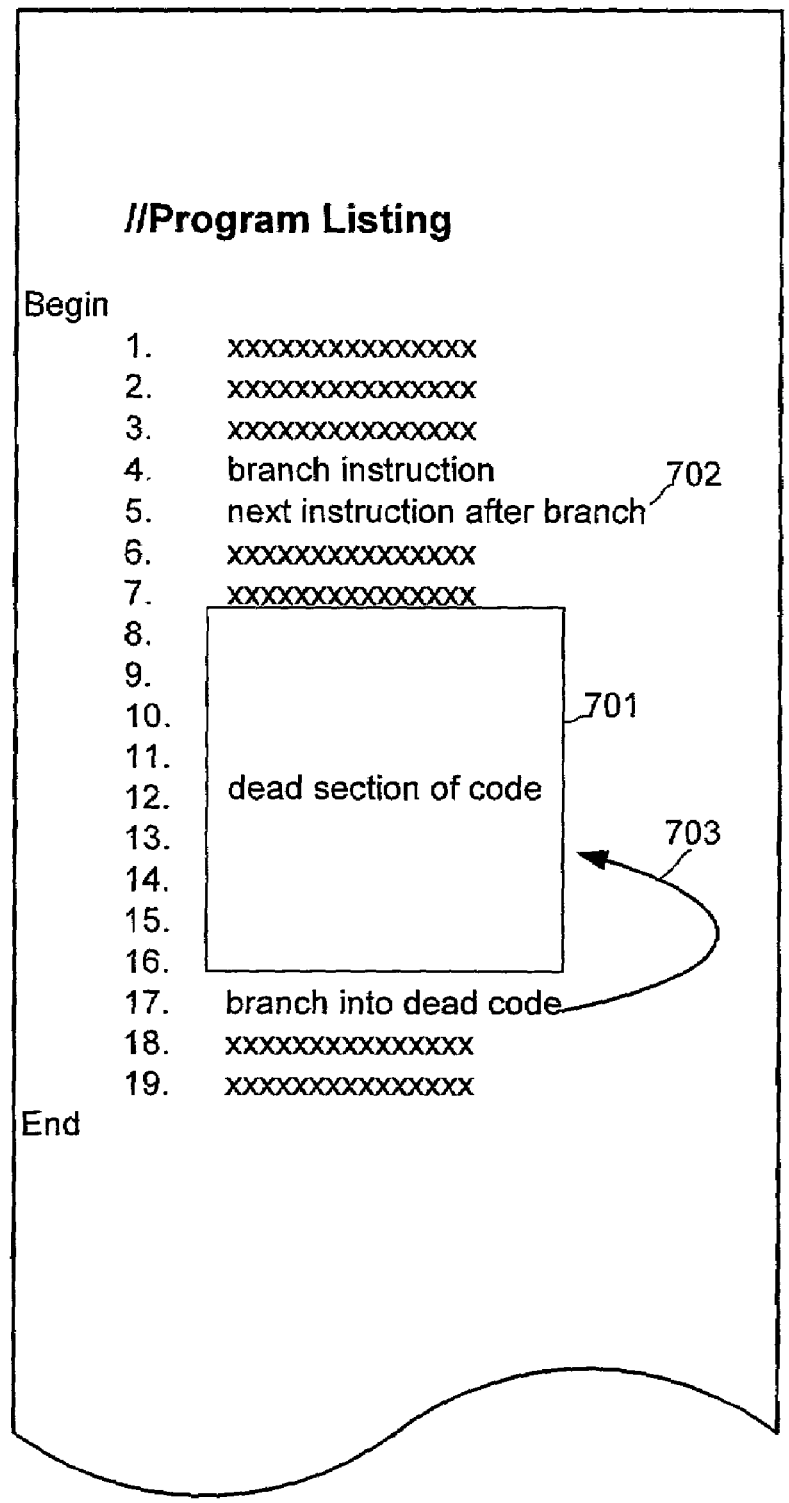
FIG. 7 is a diagram depicting basic block identification in the context of a dead section of code.

Basic Block Level. In another embodiment, an exception throwing instruction(s) is placed at the basic block level 503. Generally, a basic block is a sequential series of instructions that once entered, will be sequentially completed. Inserting (or placing) an exception-throwing instruction as the first instruction in a basic block containing unresolvable code ensures that any data manipulation that would occur after entering the basic block but before encountering the unresolvable code, will not be executed. This helps insure that data is altered only in atomic units of basic blocks. In one embodiment, as shown in FIG. 6, the basic block level is identified as follows:

A. Go through the code line by line:
  i. Any instruction that causes you to branch away from a linear traversal of code 601–02 marks the end of a basic block, and the next instruction is the beginning of a new basic block 603–04; plus
  ii. Any place that receives the branch away from a linear traversal of code 605–06 is the beginning of a basic block.
B. Place an exception-throwing instruction(s) in front of the first instruction in a basic block containing unresolvable code 607.
C. Further, as shown in FIG. 7, if a section of code is so bad that the point where a next instruction begins is unidentifiable (dead section) 701, then place the exception-throwing instruction in front of the last known basic block above the dead section 702.
  i. But if some other section branches into the dead section 703, then check to see whether the instruction where the branch leads is determinable, and if so start a new basic block there 703; then resume the line by line traversal looking for branches as discussed in paragraph A.
D. If there is no definable basic blocks found in a method as shown in FIG. 8, then place the exception throwing instruction in place of the method 801.

Using this embodiment of determining basic blocks, the exception throwing instruction in the above method 500 would be inserted immediately in front of the following line: "y:=(200000*0.16)" 504.

Instruction Level. In another embodiment, the exception throwing instruction(s) replaces the actual instruction(s) of unresolvable code 501. Such an embodiment would place the exception-throwing instruction in the output steam where the translated unresolvable code would have appeared had it been successfully translated.

Further, insertion and replacement of unresolvable code with an exception-throwing instruction(s) may have the same meaning. For example, if an exception throwing instruction is inserted as the first line in a basic block, it is possible (depending on the exception handling) that no other line in the basic block will be executed. In such an embodiment, it would not matter whether the exception-throwing instruction was inserted in front of the first line of code in the basic block, replaced the first line of code in the basic block, or replaced the entire basic block. In all three cases, the subsequent instructions in the basic block would not be executed (again, this assumes no handler returns execution to the balance of the basic block, which is discussed below).

Finally, in some cases, the exception-throwing and/or handling instruction(s) are inserted in the output stream in a new basic block with control flow and/or data flow that would otherwise encounter an unresolvable translation errors, directed to the new basic block. Other methods may also be employed to direct the execution path to inserted instructions. The point is to direct the control path to the inserted instructions in the case of unresolvable translation errors.

Exception-Throwing Instruction Insertion Module(s)

For purposes of illustration, and not to limit the scope of the invention, an example of a translator containing multiple sub-units of translation is discussed. The discussed functionality and the combinations of discussed functionality need not be present any particular embodiment.

In an embodiment, both method level and basic block level exception throwing instruction(s) insertion modules are indicated for an intermediate language code translator.

Figure 9:
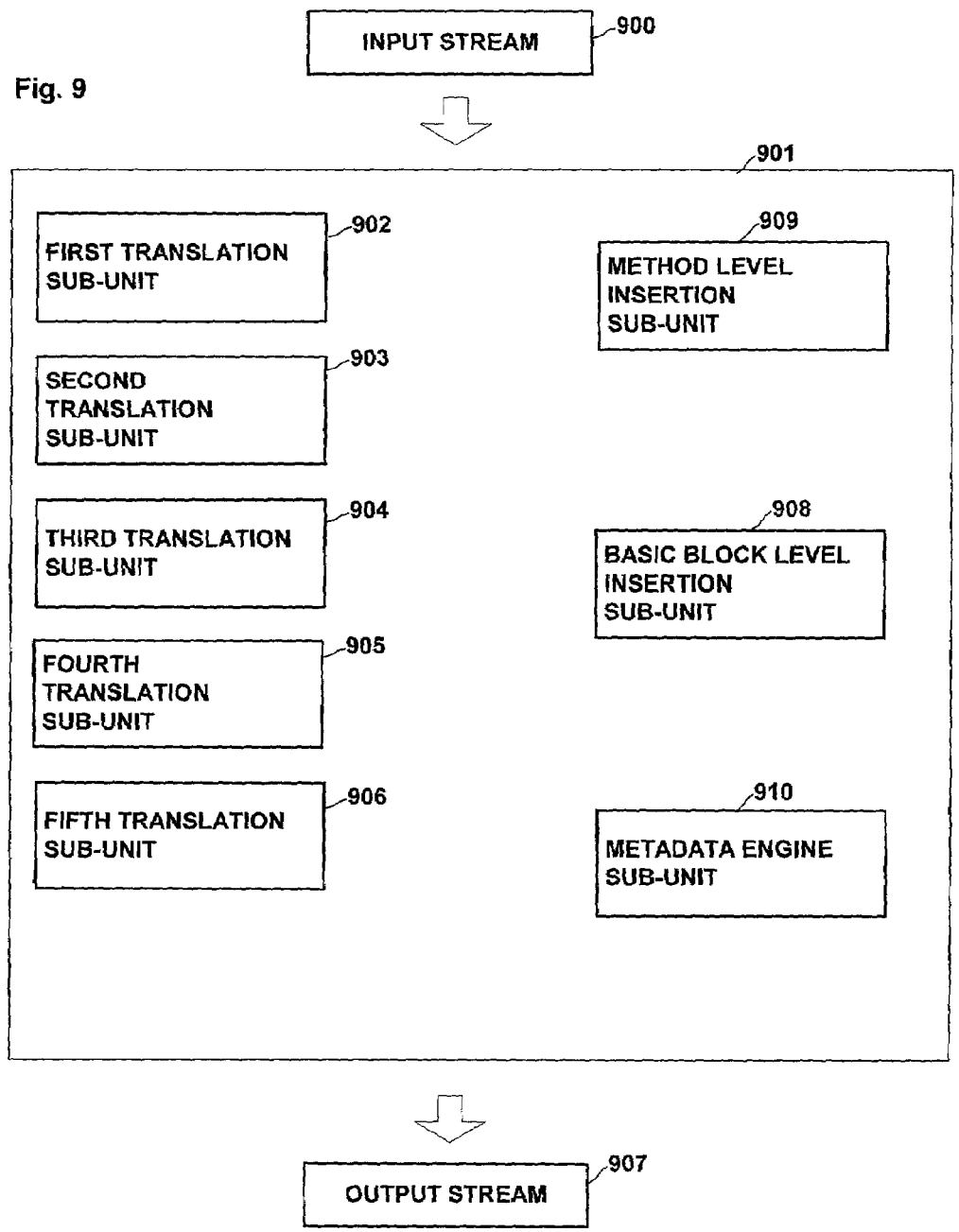
FIG. 9 is a translation flow chart of translation sub-units.

As shown in FIG. 9, the input stream 900, is translated into an output stream 907, in a series of five translation sub-units 902–906. (A translation process is an aggregate manifestation of one or more sub-units of translation. See above "Unresolvable Translation Errors.") During translation, if unresolvable code is encountered, an identifying translation sub-unit calls upon an exception-throwing instruction insertion module (sub-unit) to generate an exception throwing instruction in an indicated position 908–909. It shall be understood that these insertion modules 908–909 can inserted exception-throwing and/or handling instructions in the output stream.

In the first translation sub-unit 902, the input stream is scanned to determine the types of parameters and local variables. Upon identifying unresolvable code, the first translation sub-unit calls the method level exception-throwing instruction(s) insertion module 909, indicating the location of the method containing unresolvable code. In this embodiment, the sub-unit determines that execution of any part of the method would be unacceptable since there is unresolvable code that has a global affect on the method. (In another embodiment, this determination could be made in an exception-throwing instruction(s) insertion module in response to notification of unresolvable code.) The method level exception-throwing instruction(s) insertion module 909 generates an instruction and inserts the instruction(s) in a strategic location in the output stream, so that it is executed in the event the effected method is called from anywhere in the translated code. This can be accomplished by placing the exception throwing instruction(s) in a single location in the output stream and having all calls to the effected method directed to the single location. It can also be accomplished by placing the exception-throwing instruction(s) in each location where the method is called. In some cases, a method level exception-throwing instruction may determine that even though a method is unsafe in general, a particular invocation of that method is safe. In such a case, the translator may generate a safe instance of the safe method invocation at the location where the safe method invocation is called (this process is called "in-lining" a method) while otherwise placing an exception-throwing instruction(s) at the actual method. There are many other ways known in the art for directing an execution path.

In the second translation sub-unit 903, if the second translation sub-unit is unable to form proper basic blocks for a given method, then the second translation sub-unit can not determine any safe portions of the method that can be executed. (In another embodiment, basic blocks are determined in procedures, objects, functions, spaghetti code, or etc.) Although global method values are safe (as described in the first translation sub-unit), the second translation sub-unit 903 can not segregate the unresolvable code into a determinable basic block, which leaves the entire method at risk. The second translation sub-unit invokes the method level exception-throwing instruction(s) insertion module 909 to generate exception throwing instruction(s) at a strategic location so that the exception throwing instruction(s) is executed in the event the method is called.

In the third translation sub-unit 904, since translation is past the first and second translation sub-units, the basic blocks are determinable. This allows the unresolvable code to be segregated into a single basic block and allows the method to be utilized in general cases. In this embodiment, the third translation sub-unit translates each basic block by converting the intermediate language code into an abstract syntax tree representation, and upon identifying unresolvable code, employs the basic block level exception-throwing instruction(s) insertion module 908. The third translation sub-unit determines that execution of any part of a basic block containing unresolvable code is unacceptable. (In another embodiment, this determination could be made in an exception throwing instruction insertion module). The basic block level exception-throwing instruction(s) insertion module 908 generates an instruction and inserts the instruction(s) as the first instruction executed when that basic block is executed. In one embodiment, the exception throwing instruction(s) is inserted in place of the first instruction in the basic block. In another embodiment, the insertion is made instead of and in place of the entire basic block (this embodiment assumes no handler will allow recovery of any sub-part of the affected basic block).

In another embodiment, an instruction level exception throwing instruction(s) module is employed to insert instructions in place of encountered unresolvable code at the individual unresolvable instruction level.

In another embodiment, a single exception throwing instruction(s) insertion module is employed to insert exception throwing instructions in translated code at all levels comprising instruction level insertion, method level insertion, and basic block level insertion. An exception throwing instruction(s) insertion module shall also be called an exception throwing instruction(s) insertion translation sub-unit (or insertion sub-unit), and an inserted exception instruction may also be an exception throwing object instance of an exception throwing class.

Finally, the illustrated exception throwing instruction insertion modules 908–909, can also insert new basic blocks (methods, instructions, or etc.) anywhere into the output stream, such new basic blocks containing exception-throwing and/or handling instruction(s). In such an embodiment, control flow in the output stream will be adapted to direct execution to such new basic block in the event the execution path would otherwise encounter an unresolvable translation error, for a given execution path case. A more detailed example of this embodiment is discussed below in "Code Verification." However, this embodiment applies not only to code verification, but to all sub-units of translation. See FIG. 3.

Handling Exceptions Thrown

One embodiment inserts a standard exception-throwing instruction for all cases when unresolvable code is encountered in the input stream. In such an embodiment the translated code containing the standard exception throwing instruction throws the exception upon execution of the instruction. In such an embodiment the thrown exception causes the executing translated program to halt execution and return control to the operating system.

However, it is not unusual in the prior art for a program to have one or more exception catch instructions existing in the translated code. These try-catch type instructions, and other forms of handling instructions can be found in many modern languages such as ADA, C++, and Java. See H. M. Deitel, *C++ How To Program*, Prentice-Hall, Inc. 1994, and see Gary Cornell, *Core Java*, Second Edition, SunSoft Press, 1997. These exception catch instructions often exist throughout multiple levels (e.g., nested method calls) in the program structure and are discussed in the prior art. Yet, these prior art exception catch routines were not specifically written to accommodate an executed exception throwing instruction inserted in translated code in response to identifying unresolvable code in an input stream. Subsequently, when an exception throwing instruction that is inserted by the illustrated embodiment is executed and thrown, the thrown exception will propagate back through the multiple levels of the program structure, potentially identifying prior art exception catch instructions (and/or handlers) in the stack dump path, without encountering a tailored catch or handler.

In another embodiment, in addition to identifying unresolvable code in an input stream, both an exception throwing instruction(s), and an exception catching instruction(s) are inserted in the translated code. In such an embodiment, the exception catching instruction contains or indicates an appropriate handler for the corresponding inserted exception throwing instruction. Such a contained or indicated handler provides either a context specific graceful exit from the program or a context specific exception recovery.

In another embodiment, the inserted exception throwing instruction is thrown upon execution and subsequently caught by the inserted exception catch handler existing within the translated program, or if the translated code contains no exception catch handlers, the exception propagates all the way to the operating system for any potential handling.

Figure 10:
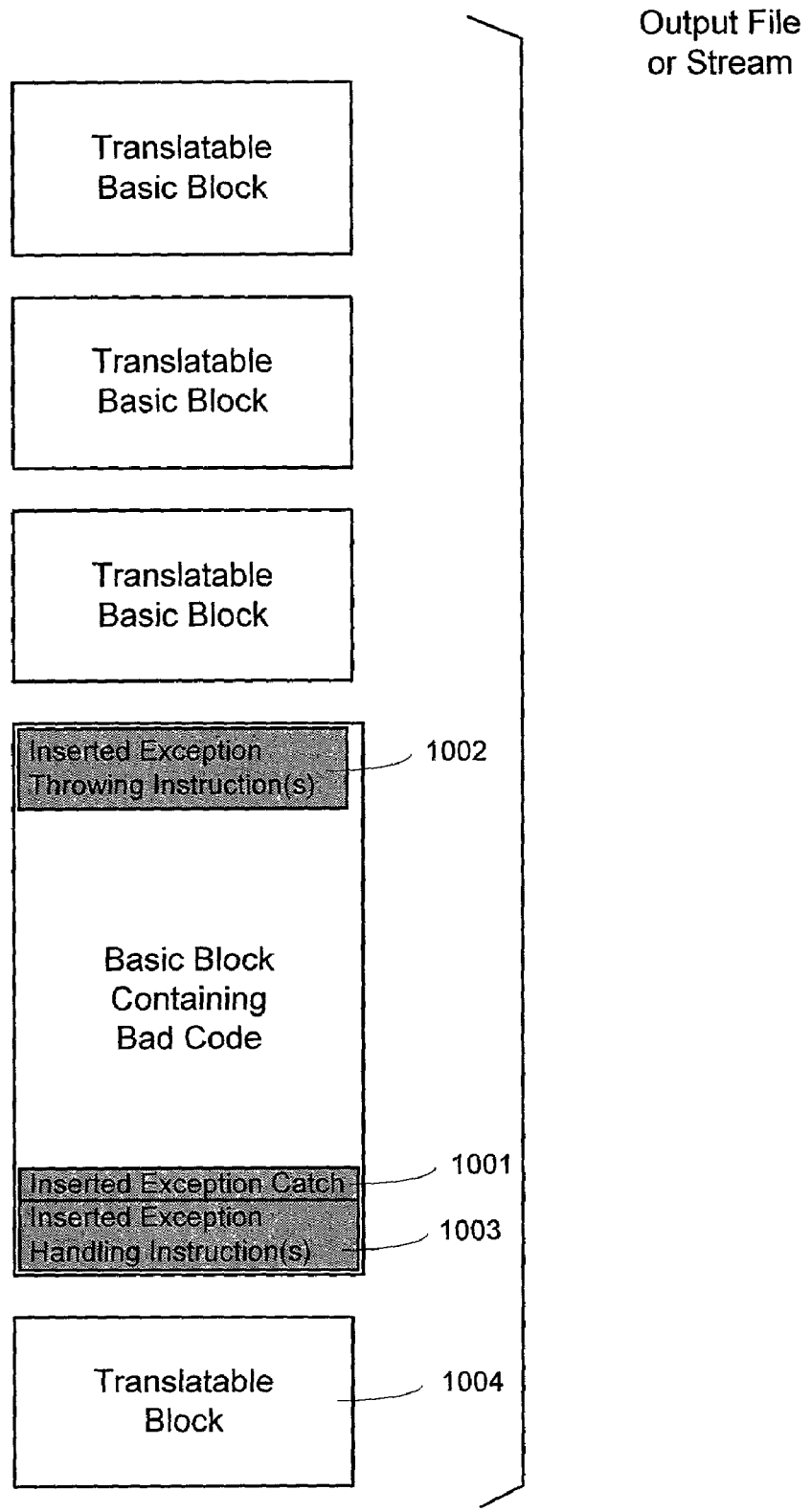
FIG. 10 is a program listing depicting Basic Blocks, one of which has an inserted exception throwing instruction, an exception catch, and an exception handler.

In another embodiment, as shown in FIG. 10, an exception catch instruction(s) (and/or handler) is placed in the execution path for the method, basic block or section of translated code containing the inserted exception-throwing instruction. In such an embodiment, the exception catch instructions (and/or handler) 1001 is placed in the output stream in addition to placing the exception-throwing instruction 1002 in the output stream. The catch routine (or handler) 1003 either returns control to (i) the next basic block 1004 in the execution path, (ii) the next line in the main after the call to the method containing the instruction, or (iii) a specialized exception handling routine that facilitates controlled exception recovery in response to exception throwing instructions.

Figure 11:
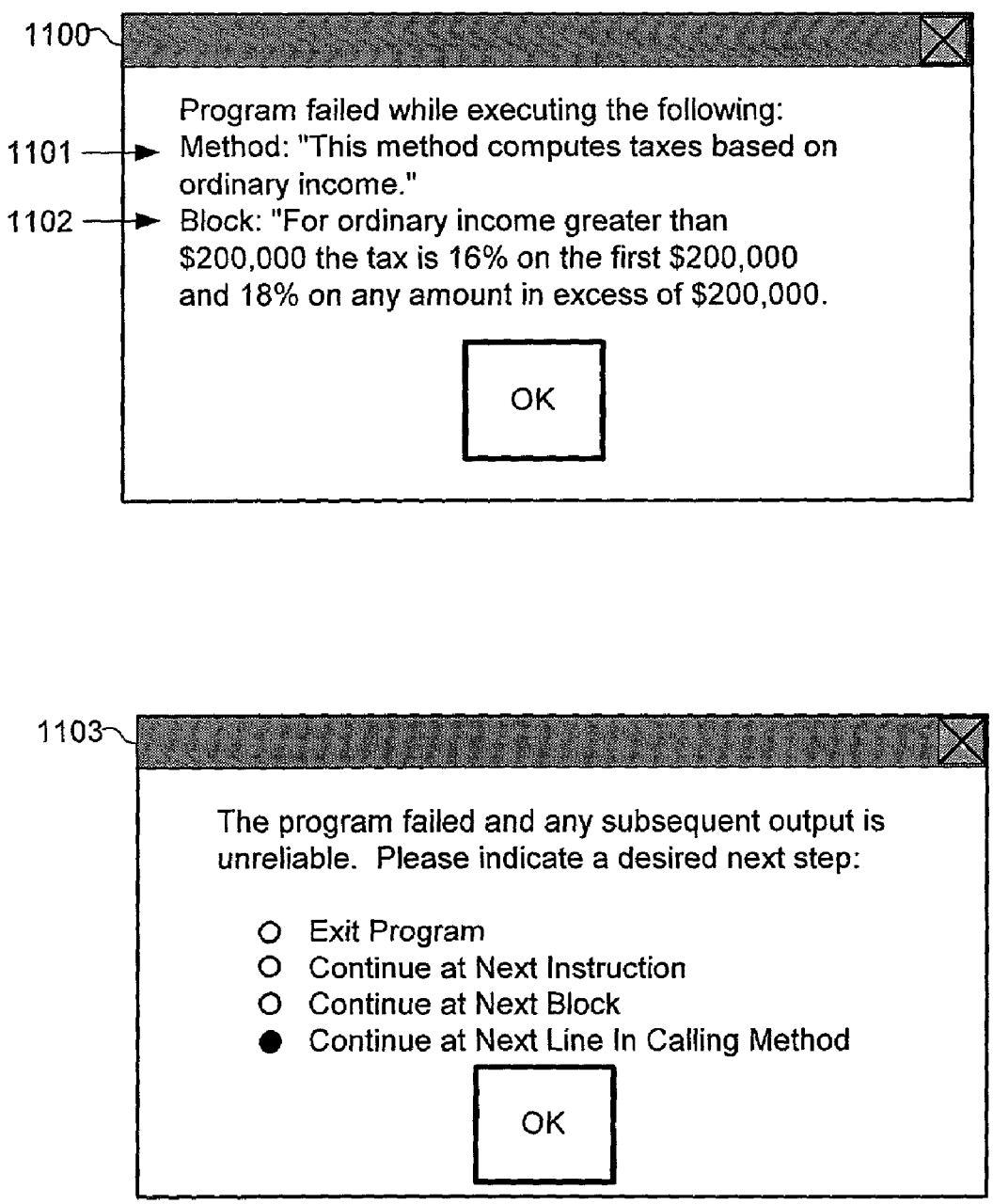
FIG. 11 is a diagram depicting two separate examples of windows generated in response to a graphical handler.

Another embodiment places a catch handler in the output steam in addition to placing the exception throwing instruction in the output stream. In such an embodiment, as shown in FIG. 11, an executing catch handler notifies the user about the exception by executing a window graphical user interface (GUI), where the GUI includes a discussion and disclosure about the method or class in which the exception-throwing instruction was encountered 1100. In such an embodiment, this GUI discussion and disclosure is taken from the source code developers comments, including comments about the method 1101, basic block 1102, or instruction where the unresolvable code was encountered 505–506. In another embodiment, such discussion and disclosure is taken from metadata in the input stream. In such an embodiment, the metadata directs discussion and disclosure pertinent to the instruction, method, basic block, etc., that contained the unresolvable code. As shown in FIG. 5, the source code developer appropriately places comments and/or metadata in the source code 505–506 that is translated through to the present input stream and incorporated by an embodiment into the catch handler. (see below "Metadata Engine").

In another embodiment, an inserted GUI catch instruction handler presents the user with alternative ways to continue. In one such embodiment, as shown in FIG. 11, the GUI catch handler offers a list of options 1103 to the user—exit program, return control to the next instruction, return control to next basic block in suspected execution path, return control to next method in suspected execution path, or return control to the next line in the main after the call to the method containing the exception.

In another embodiment, as shown in FIG. 10, an exception catching and an exception throwing instruction(s) 1001–02 are inserted upon identifying unresolvable code, and the inserted instructions are subsequently thrown and caught during execution, and the catching instruction(s) identifies the class of the exception caught, and determines an exception handler class based on the class of the exception caught 1003. In one such an embodiment, the handler class for the thrown exception class is identified from class library. This exception class linking can be done at translation-time, or subsequently at run-time. In another such embodiment, the handler class for the thrown exception class is dynamically obtained from a remote class library by linking or by exchanging messages with a local or remote server at run-time. In such an embodiment, the identified, linked or obtained handler class is executed. Given such an embodiment, as shown in FIG. 5, a source code developer indicates a desired exception throwing instruction class 507 to be thrown, by including appropriate comments and/or metadata in the source code. Thus, a source code developer knows that an indicated exception class 507 will cause a given handler to be employed locally, or a given handler to be obtained remotely to handle such an indicated 1002 thrown exception class. Such a dynamic handler determination, in addition to handling versatility, provides a methodology for obtaining an earlier execution environment compatible version of a method (procedure, instruction, etc.). Such run-time handler determination is discussed further below.

Metadata and Security

In one embodiment, a translator alters its translation behavior based on the source of the first language input stream. In such an embodiment, the translator determines that some portion of the input stream is ambiguous but still translatable. Code that is ambiguous but still translatable is called "suspected code." In another embodiment, the section of ambiguous code falls within one of plural classes of ambiguous but translatable suspected code. Such suspected code is code that is received in an arguably expected or translatable format, but for one reason or another remains suspected or potentially unsafe. Suspect code is a subset of the universe of unresolvable code.

In such an embodiment, if the input stream containing the suspected code is from a reliable or secure source, the translator translates the suspected code into the second language output stream without placing an exception-throwing instruction in the output stream. The suspected but translatable code is translated into the second language without an exception-throwing instruction being inserted, because the suspected code is from a trusted source.

An example of such an embodiment, as shown in FIG. 12, is an identifier (or assignment to an identifier) in the (first language) input stream that the translator is unable to safely type check 1202. Such an embodiment determines based on the software developer source of the input stream 1201 that the otherwise suspected code should be translated without placing an exception-throwing instruction (or handler) in the output stream.

Another example of such suspected code, is an input stream containing a link to a remote resource 1203, the linked resource being a remote resource where identifiers within the input stream are defined or where class libraries requested by the input stream are available. If the link is down at translation time these identifiers would not be verifiable. However, since the input stream is from a trusted source 1201, an illustrated embodiment completes translation and creates translated code as if the link were up and the identifiers were verified, and without placing an exception-throwing instruction in the output stream. In such an embodiment, if necessary, a handler is placed in the output stream to facilitate run-time linking in the event a trusted link is accessed by the executing translatable code at run-time.

In such an embodiment, the translator needs a way to identify the source of the input stream (or file). In one embodiment, if the input stream was obtained over the network, the source of the software is determined based on identification of the domain server source 1204 (or an IP packet). In another embodiment, the source of the software is determined by an identifier (or metadata) contained in the (first language) input stream 1201, 1204, 1205, 1203.

Another embodiment determines that although an input stream (or file) is not from a trusted source, the source is instead 'certified' by a trusted source 1205. In one such embodiment, a source certification is published by a trusted source. In another embodiment, a source certification library is periodically updated dynamically using methodologies similar to present day virus definition file updates. In another embodiment, a source certification is available at a link (or message server) provided by a trusted source 1204, or a trusted source provides a key to the unknown source that when received is proof that the unknown source is certified 1205. Such a key or other identifier proving certification is either known in advance or discoverable by an embodiment through a link to a remote server 1204. Another embodiment accesses a known or designated trusted source server to determine whether an input stream is trusted or certified.

In another embodiment, metadata in the (first language) input stream identifies its source 1201. In another embodiment, metadata identifies the input stream as being certified by a number of sources which are all trusted sources 1205. In another embodiment, the software source is determined based on (i) the source domain identification, (ii) metadata containing identification information, or (iii) other certification of source by either predetermined static methods (e.g., table of trusted sources, or table of trusted certification numbers) or translation time discovery methods (e.g., opening a link to trusted source or exchanging messages with a trusted source). Further, in another embodiment such sensitive information is protected with security measures like private-public keys or other forms of encryption, or encoding. For purposes of this specification, the term trusted source means a source that is determined by any combination of the above described methods to be accorded some positive consideration in how or whether an input stream is translated. An untrusted source may be accorded negative consideration in how it is handled, and an unknown source may be treated without consideration or be treated as either trusted or untrusted depending on security considerations.

The identification of software source 1201 is used as a way to distinguish between multiple potential ways to handle unresolvable or suspect code. The unresolvable code 1202 falls within classes of unresolvable code. Such classes are divided into the logical classes discussed above (Unresolvable Translation Errors), and these classes may be further distinguished by classes of suspected code. Further, how a class of unresolvable (or suspected) code is handled by an embodiment can be based on the trust level of the source. For example, a class of unresolvable or suspect code is handled based on the associated trust level of the source. In such an embodiment, upon identifying unresolvable or suspected code, if the software is from a higher level trusted source 1201, the embodiment simply translates the suspected code without further limitation, and translates the unresolvable code into an exception-throwing instruction(s).

In one embodiment, whether or not translation continues upon identifying unresolvable or suspect code, depends on where the input stream is obtained or who developed the input stream. In one such embodiment, for cases of an unknown or untrusted software source, the translation stops upon identifying unresolvable or suspect code. In a second embodiment, translation continues in the case of an unknown or uncertified source, and an exception-throwing instruction is inserted in place of unresolvable or suspect code. In a third embodiment, in the case of a known or trusted source, translation continues upon identifying suspect or unresolvable code, thereby creating translated code containing exception-throwing instructions in place of unresolvable code and translated code in place of suspect code.

In another embodiment, metadata (or other identifiers) in the input stream suggests or enumerates levels of placement for exception throwing instructions 1206 (method, basic block, or instruction). In one such embodiment, the metadata is consolidated within one area of the input stream 1207 (e.g., the beginning, or end) and describes exception handling for the entire program. In such an embodiment, exception throwing instruction(s) insertion can first be attempted in all cases at the basic block level (default) 1206 and then if the basic blocks are not determinable, then attempt a method level insertion 1206. In such an embodiment, metadata can enumerate special conditions for insertion, like instruction level insertions for run-time handler linking 1210. Such an embodiment could default to basic blocks in all cases except run-time linking to obtain exception handlers either locally 1209, or remotely 1210.

In another such embodiment, metadata (or other identifiers) suggest or enumerate exception-throwing instruction(s) for each such method, object, procedure, or instruction in the input stream. In such an embodiment, as shown in FIG. 5, the metadata (or other identifiers) are dispersed throughout the input file or stream, being near and/or identifying each such method or basic block, and suggesting or enumerating an exception-throwing instruction(s) or handler for such individual method 512 or basic block 507–511 in case of translation errors. In such an embodiment, the source code developer appropriately documents the source code with the requisite metadata or comments.

In another embodiment, metadata (or other identifiers) enumerates classes of handlers for exceptions thrown in place of specific areas of the program 507–512 (methods, basic block, instruction levels) in the event of translation problems. In such an embodiment, the classes or description of handlers may be an identification of a static known handler class or a dynamically (locally or remotely) discoverable handler class. These handlers can be obtained and placed in the output stream at translation time, or can be obtained and executed at run time dynamically when an inserted exception is thrown.

In another embodiment, identification of the exception handler enumerated in the metadata for a given case 507–512 (method, instruction, or basic block level) is accessed (locally or remotely) at run-time 1208–1209 when the exception is thrown. In such an embodiment, after an exception is thrown 1409 and caught by a handler inserted in the translated code 1402–1403, the handler method dynamically opens a link (or sends a message) identifying the exception thrown based on an exception class identifier, and the dynamic link (or return message) returns a handler routine for the identified exception. This link in response to an executed exception throwing instruction is distinguished from a handler obtained at translation time.

In such an embodiment, the source code developer associates an exception class (or type) for each area (method, procedure, instruction, object, data structure) with a designated link or path to access the designated handler, and the associated exception class and link/path are placed in the output stream for use by the executing environment. (See below "Exception Handling Data Structure," for an example embodiment.) This reduces the volume of comments/metadata in the input stream because handlers are omitted. Further, it provides notice to the source code developer when a link is contacted to obtain a handler. The source code developer can use this notice to improve source code, comments, metadata, and/or intermediate language code sent out over the network. Such source code developer notification provides a feedback loop for program improvements.

Exception Handler Methods

Figure 13:
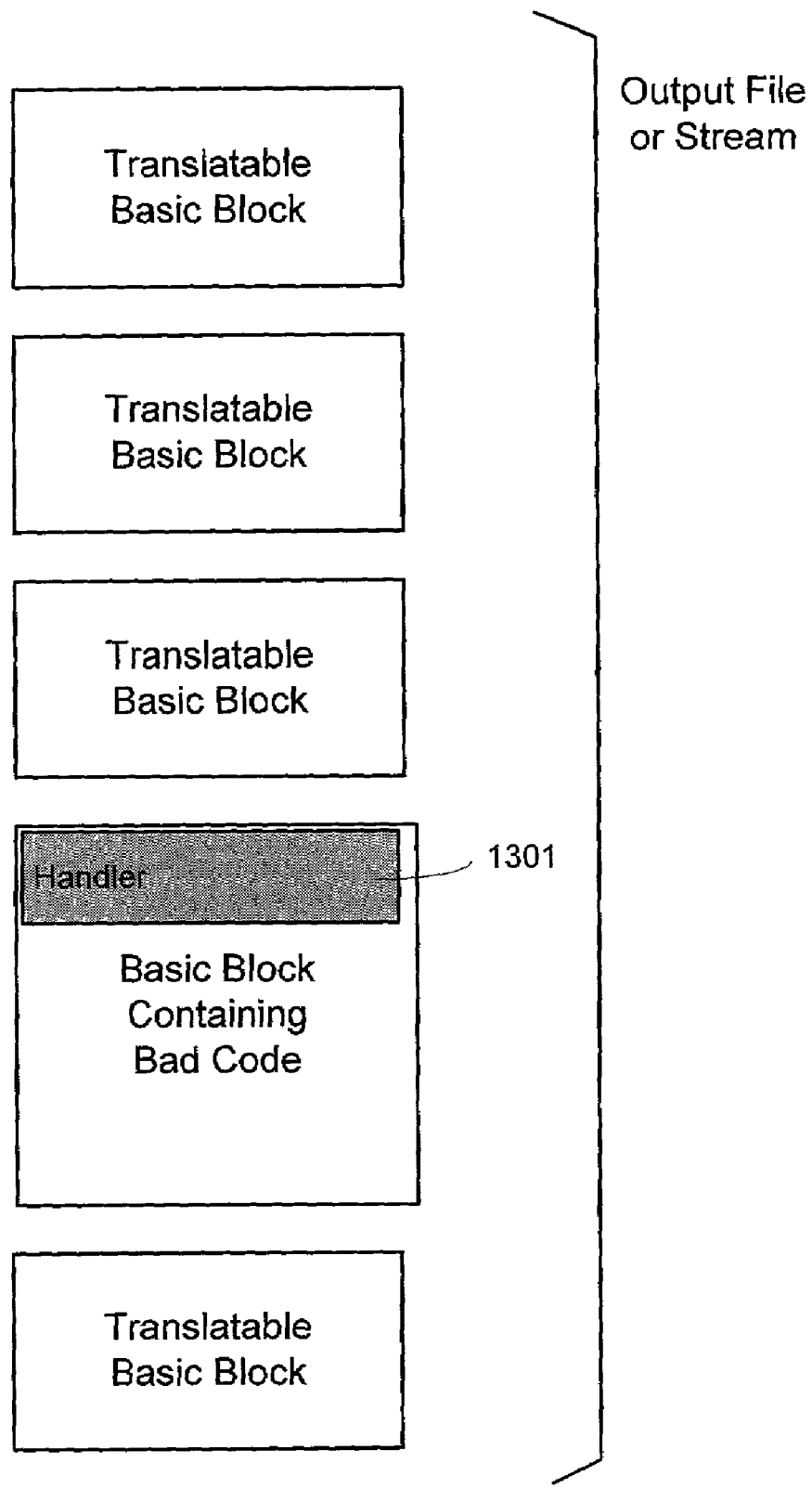
FIG. 13 is a diagram depicting Basic Blocks; one containing an inserted handler.

In an illustrated embodiment shown in FIG. 13, an exception handler 1301 is placed in the second language output file instead of the prior discussed exception throwing instruction. Instead of inserting a exception throwing instruction(s) in the translated code, a handler instruction(s) is inserted in the translated code. In such an embodiment, the handler is inserted either at the instruction level, the method level, or the basic block level using the same methods as described above for inserting exception-throwing instructions. In another embodiment, the exception handler is inserted in place of unresolvable code anywhere in the execution path that allows a graceful exit from the program, or allows graceful recovery handling as described above for exception catching instructions, catch handlers, or exception handlers. This embodiment produces the same functional results as the earlier described throw-catch-handle embodiment (see FIG. 10), without the throw catchg instructions. Thus, all other embodiments can be trivially imported into this handler instruction embodiment (FIG. 13).

In another embodiment, an inserted exception handler 1301 sends a message to an output device identifying the area of the program where the unresolvable input requiring the exception handler was located potentially describing the function of the identified area of the program 1100.

In another embodiment, the handler instruction is a standard handler (e.g., x86), or a specific handler created in response to the unresolvable input causing the handler insertion.

In an embodiment implementing a specific exception handler in response to unresolvable input, metadata in the input stream identifies potential classes of exception handlers for corresponding areas of the input stream. In such an embodiment, the class library for potential classes of exception handlers is located local or remote (as previously described), and can be linked at translation time or obtained at run-time upon executing the handler instruction(s).

Finally, the term handling instruction(s) will include either a handling instruction alone 1300, or a catch-handling instruction(s) combination 1001, 1003.

Metadata Engine

In prior paragraphs in this specification including "Metadata and Security," several embodiments used source code developers metadata, identifiers, and comments in the input stream to help implement a number of features of the illustrated embodiments. Further, a previously discussed embodiment mentioned that the exception-throwing instruction(s) can be placed in the second language output stream in place of unresolvable code whether that second language output stream is (i) the output stream of the first translation in a series of N translations, (ii) the last translation in a series of N translations, or (iii) any translation in the series of translations one through N, where N is greater than or equal to one.

In order for source code developers metadata, identifiers, and comments to propagate through N levels of translation, each translator in the N translation phases must propagate this information into a recognizable format in a translation code output stream.

For example, in the case of a two phase translation process (e.g., phase 1: source code to intermediate language code; phase two: intermediate language code to object code), the source code developers metadata, identifiers, and/or comments must pass from the source code into the intermediate language code where it can be used by an embodiment to create one or more of the described features (e.g., 1100–1103, 1409, 1402–1403, 1406, 1001–1003, 1201, 1203–1209, 1301) in the object code. Although the desired level of specificity must pass through successive phases of translation, encoding and compression can be employed to reduce the volume of the input stream and output stream.

In an embodiment, as shown in FIG. 9, a translator includes a sub-unit for placing the source code developers metadata, identifiers, and/or comments in the output stream 910 along with the translatable code. For simplicity, the sub-unit placing source code developers metadata, identifiers, and/or comments in the output stream is called a metadata sub-unit.

Finally, metadata and/or comments contained in the source code, input stream, and/or the output stream of subsequent phases of translation shall also be known as "declarative textual indication(s)."

Catch and Handler Instruction(s) Insertion Modules

In an embodiment, that inserts exception catching instruction(s) and/or exception handling instructions into translated code in response to inserting exception throwing instruction(s) into translated code, an instruction insertion module is employed. In such an embodiment, as illustrated in FIG. 9, the same module (or sub-unit) that inserted the exception throwing instruction(s) into the translated code 908–909, inserts the exception catching instructions and/or the exception handling instructions(s) into the translated code.

In another embodiment, a separate sub-unit is used to insert each type of inserted code. One such insertion module (or sub-unit) inserts exception throwing instructions in the translated code, a second such sub-unit inserts exception catching instructions in the translated code, and a third such sub-unit inserts exception handling instructions in the translated code.

In another embodiment, a single sub-unit inserts all instruction(s) in response to unresolvable code, whether they be exceptions, catches, or handlers, and regardless of the level of insertion (instruction, level, basic block level, or method level).

Exception Handling and/or Data Structures

Figure 14:
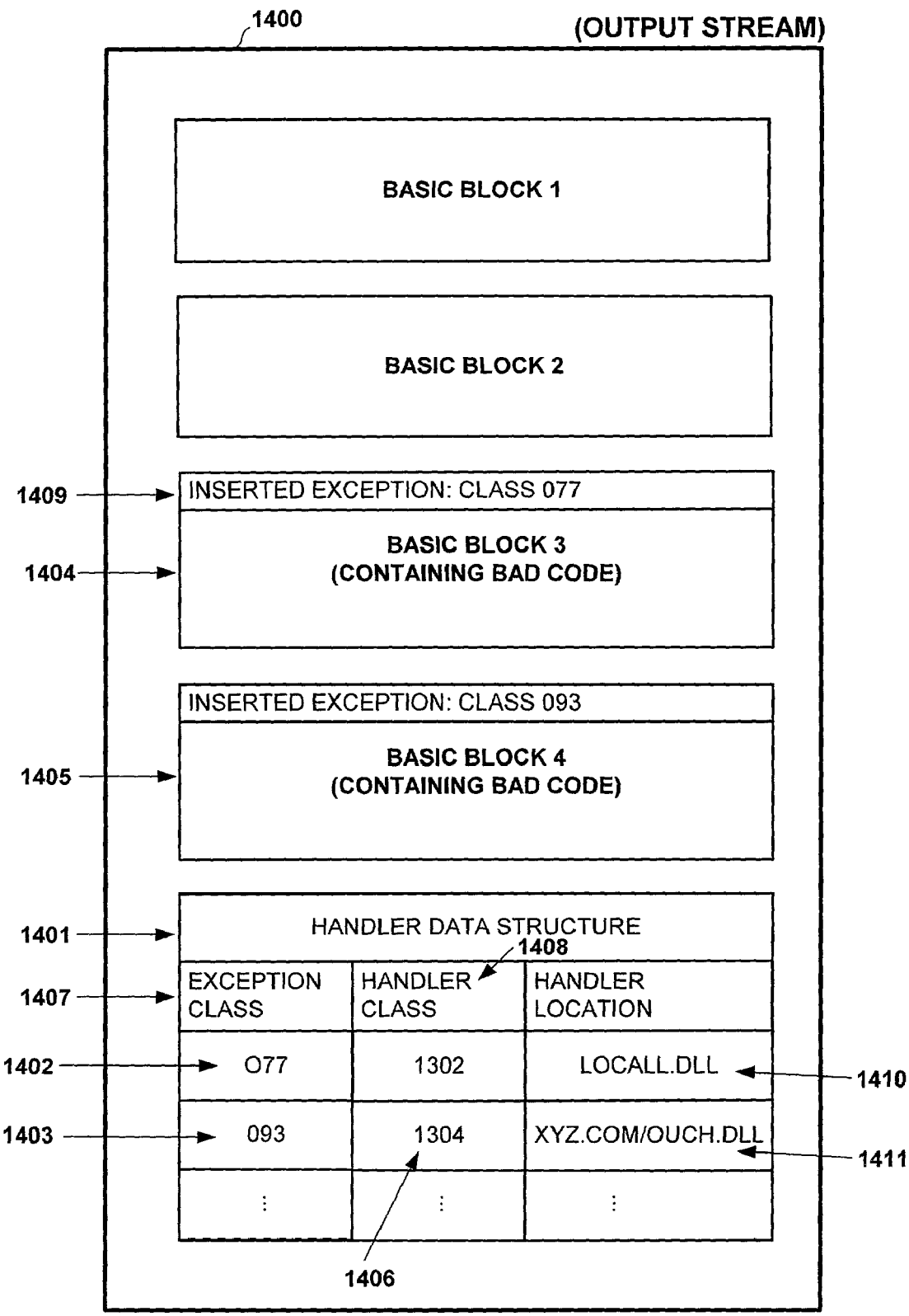
FIG. 14 is a block diagram of an output stream listing including a handler data structure.

In an embodiment, as shown in FIG. 14, each method (procedure, basic block, function, program main, etc.) in the output stream maintains a possibly empty data structure of exception handling information 1401. In such an embodiment, this exception handler data structure enumerates the protected basic blocks within a method 1402–1403. A basic block is protected if it contains an exception throwing instruction (and/or handler) inserted in response to identifying an unresolvable translation error in the input stream 1404–1405. A method is protected if it contains an exception throwing instruction (and/or handler) inserted in response to identifying unresolvable code in the input stream. An area of a program (or section, procedure, function, instruction, object, linked library, et.) is protected if it contains an exception throwing instruction inserted in response to encountering unresolvable code in the input stream. The handler data structure enumerates a filter 1402, and a handler 1406 for each of the enumerated protected basic block(s) of a method 1405. The filter matches an exception class 1407 with a handler designation 1408, and the handler designation identifies a handler 1406 to invoke in the event the filter 1403 matches the exception class 1409 of a thrown exception.

In response to an exception thrown from a protected block 1409, control passes to the handler data structure 1401 in the method where the exception was thrown 1400. If the filter determines that the exception class thrown matches a filter, the handler designated by the filter is executed.

If no match is found in the current method 1400, the exception handler data structure in the method calling the present method is searched to see if it contains a filter designating a handler for the thrown exception class. The search continues retracing the calling sequence until a handler is found. If no match is found, the stack trace is dumped and the program is aborted.

In another embodiment, a single handler data structure is inserted in the output stream for a given program. In such an embodiment, the handler data structure enumerates a list of exception class identifiers, identifying each exception class inserted into the output stream in place of unresolvable code, and a corresponding handler designation for each such exception class.

In another embodiment, handler data structures are inserted in the output stream at the basic block level, or instructions level, etc., in response to placing exception throwing instructions in the output stream.

In another embodiment, a handler data structure insertion module (or handler data structure insertion sub-unit, or insertion sub-unit) inserts the handler data structure into the output stream in response to the insertion of the exception throwing instruction. In another embodiment, an insertion sub-unit inserts both the exception throwing instruction and the handler data structure in the output stream.

Upon identifying a handler designation, the handler routine is identified and can be executed. The handler routine may be present in the output stream 703, obtained locally 1410 at an indicated path, or obtained dynamically through a link or message server 1411.

In another embodiment, handler instructions (and/or catch instructions) are placed in the execution path of an exception thrown from a protected method. In another embodiment, handler instructions (and/or catch instructions) are placed in the execution path of an exception thrown from a protected instruction. In another embodiment, handler instructions (and/or catch instructions) are placed in the execution path of an exception thrown from a protected program. Just like handler data structures, these handler (and/or catch instructions) can be obtained and/or linked at translation time, or obtained and/or linked at execution time when an exception is thrown.

Re-Translation Attempt at Runtime

In another embodiment, upon finding an unresolvable instruction(s) in the input stream, the translator inserts exception throwing instruction(s) (and/or handling instruction(s)) in the output stream. In such an embodiment, the translator also inserts an unaltered copy of the unresolvable code into the output stream.

In one such embodiment, upon subsequent execution of the handling instructions in the output stream, the executing handling instructions request a re-translation attempt of the unaltered copy of the unresolvable code in the output stream. In such an embodiment, when the output stream is executed at runtime, the inserted instructions request that an attempt be made to translate the unresolvable instructions. In some cases, this may resolve the error. If the re-translation attempt fails to resolve the instructions in question, then the exception-throwing instruction(s) (and/or handling instruction(s)) are executed. In such an embodiment, if necessary, a handler is placed in the output stream to facilitate run-time linking to facilitate the re-translation request.

In such an embodiment, the inserted second language representation instructions 409, would include a copy of the unresolvable code along with the instructions requesting a re-translation attempt 1003, 1301.

Code Verification

This specification has focused mainly on unresolvable translation errors in the form of unresolvable instructions in the input stream. However, exception-throwing and/or handling instructions may also be inserted into the output stream upon encountering unresolvable translation errors of many kinds. See above "Unresolvable Translation Errors." Such unresolvable translation errors are not limited. They can be any condition in the input stream that a translator determines requires exception-throwing and/or handling instruction(s) in the output stream.

For example, exception throwing and/or handling instruction(s) can be inserted for code verification rules violations during code verification. Code verifiers typically have a number of verification rules that must be verified in order to help assure a program is safe for execution. Code verifier rules vary substantially from vendor to vendor and from vendor version to vendor version of a compiler or other translation system. In code verification, the input stream is checked to see whether or not it violates any of these verification rules. One kind of code verification rule, among others, that Code verifiers enforce is type restriction rules. During code verification, if one of these type verification rules is violated, an unresolvable translation error is generated.

One example of using a code verifier to check type restrictions involves use of a stack. In general, the stack can be used by a program as an intermediate blackboard to store state information, arguments, and control flow information. Code verifiers check the argument types pushed onto a stack in order to determine whether they match the argument types required by the next instruction pulling an argument from the stack. Instructions push arguments onto and pop arguments off of the stack. Basic blocks often push arguments onto the stack and then jump to another basic block. Branch instructions introduce the possibility of encountering a basic block from different places in the program. As discussed above (Identifying Areas of Code Blocked by Exception-Throwing Instructions), branching to other instructions often creates the end of one basic block and the beginning of another. The verifier determines whether the expectations of a next basic block are consistent with the state of the stack.

In a general sense, the code verifier traverses the input stream and determines whether the state of the stack can be used by each successor basic block given the multiple execution paths that may be encountered in any given input stream. If a successor target basic block needs a stack state different than that produced by a predecessor basic block, then an instruction in that basic block is unable to obtain a required argument from the stack. In that case the verifier encounters a type that is illegal for the needs of the basic block (instruction, method, etc.), and inserts an exception-throwing and/or handling instruction(s).

A verifier keeps going as long as possible, through the input stream, in order to determine a scheme in which the stack state would be valid for a given input stream. If at some point, the verifier is unable to determine a stack state for an execution path that is valid, then an exception-throwing and/or a handling instruction(s) is inserted in the output stream. Upon encountering such an error discovered by the verifier during the control flow and/or data flow analysis, an exception-throwing and/or a handling instruction(s) is inserted into the output stream for that execution path.

Figure 15:
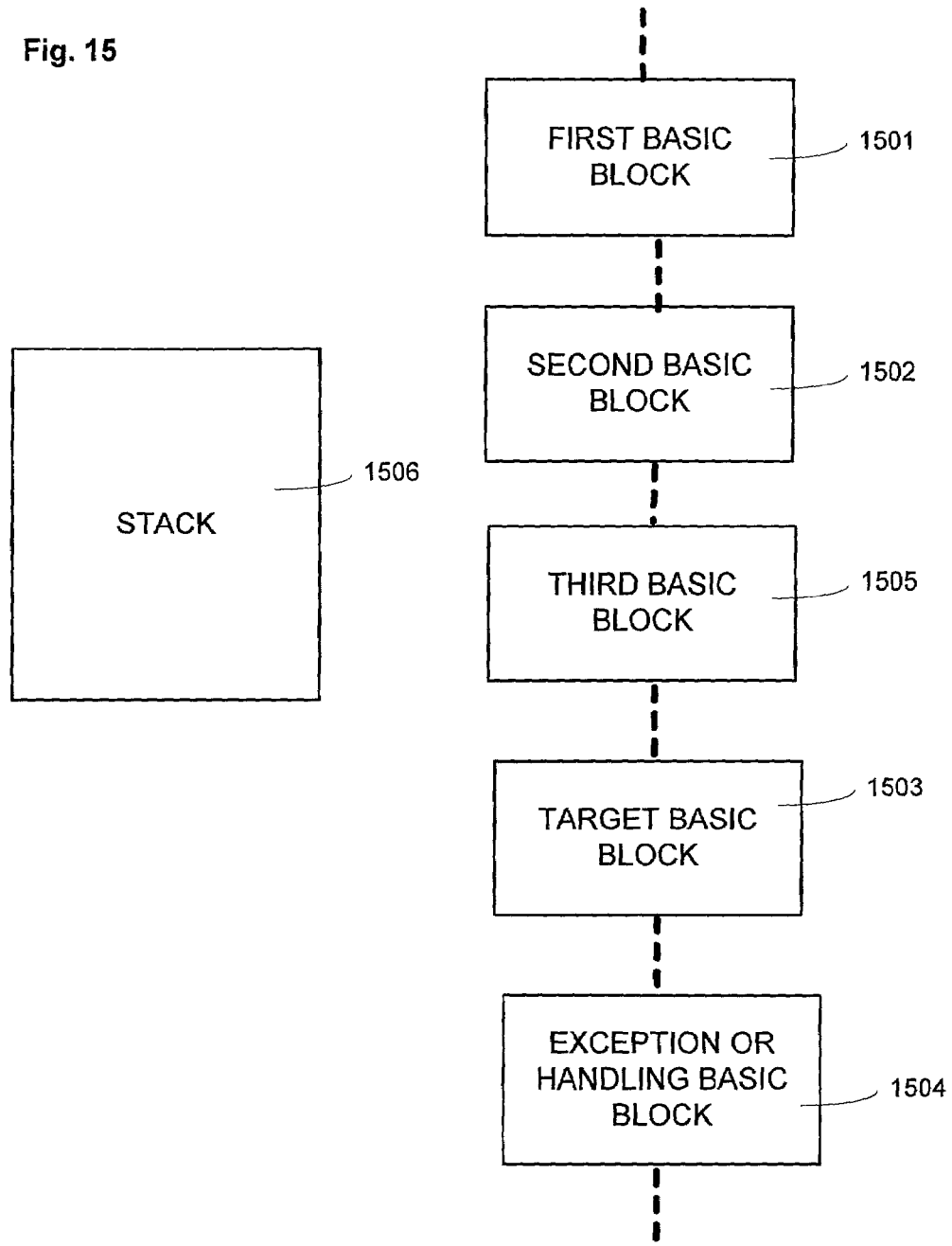
FIG. 15 is a diagram depicting an plural execution paths through plural basic blocks, a stack, and an inserted exception throwing and/or handling block.

During code verification one unresolvable translation errors are encountered as a result of a control flow and/or data flow error encountered during type verification. Such a control flow and/or data flow error can occur when a program execution path reaches the same instructions from two different places. For example, as shown in FIG. 15, it may be determined that the input stream contains a first basic block 1501 and a second basic block 1502, both of which jump to the same target basic block 1503. In such a case, a code verifier 310 checks to see whether the state of the stack 1506 before jumping from the first basic block to the target basic block is consistent with the state of the stack before jumping from the second basic block to target basic block. One such type verification rule, requires the variable types that were pushed onto the stack before jumping to the target basic block from the first basic block, are consistent with the variable types pushed onto the stack before jumping to the target basic block from the second basic block.

For example, one path may push an integer and a float onto the stack and then jump to a target location. Another path may push a pointer and a floating point variable onto the stack and then jump to the same target location. Since these two separate paths jump to the same instruction(s), and the variable types on the stack are different types, the type rule is violated.

For any given instruction (basic block, method, etc.) the execution path may arrive there linearly, or may jump there directly. If plural potential execution paths arrive at an instruction from different places in a program, then those plural potential execution paths might have pushed values with inconsistent types onto the shared stack. The verifier requires that the items pushed onto the stack and required by a target instruction (basic block, method, etc) be the same when arriving at that target instruction. Assuming that a code verifier has determined two different stack states coming from two different paths converging at the same target instruction (basic block, method, etc.), the verifier determines a rule failure. This is just one way of implementing a verifier. One skilled in the art would appreciate that this is just one possible way to implement a verifier, and that each such implementation could have many other cases where a verification rule is violated by code.

In the illustrated embodiment, the first execution path is verified and translated into the output stream, and the second execution path results in an exception-throwing and/or handling instruction(s) being inserted into the output stream 1504. Thus, the jump from the first block 1501 to the target block 1505 is translated into the output stream, and the jump from the second block 1502 to the target block is translated into a jump to an inserted exception-throwing and/or handling instruction(s) 1504. It is interesting to point out that this is an unresolvable translation error even though all individual instructions are directly translatable. In the next example, the jump is not always directed to the inserted instructions.

In the next example, a first basic block 1501 ends in a conditional jump. The conditional jump, jumps to two different locations 1505, 1503 based on the condition. During verification, the first jump to the third basic block 1505 is determined to be verifiable, but the second jump to a target basic block 1503 is determined to create an unresolvable translation error based on a control flow and/or data flow problems. In the second jump, upon encountering the target basic block, the verifier determines that the argument/object types on the stack are inconsistent with the argument/objects types required by the target basic block. Since the state of the stack from the second jump is inconsistent with the state of the stack required by the target basic block, an exception-throwing and/or handling instruction(s) are inserted in the output stream 1504. In such a case, the inserted instructions 1504 are executed only when the conditional jump is to the target block. The output stream is arranged accordingly. A failure block 1504 is being inserted because of control flow and/or data flow problems discovered during verification that occur only in the conditional jump from the first basic block to the target basic block.

In another case, the verifier will attempt to merge the stack state with the state requirements of several related basic blocks. Such a case occurs when two basic blocks jump to the same target basic block. The verifier will attempt to try to come up with a stack state that is consistent for the basic blocks jumping to the target basic block and for the target basic block. This is called merging the stack. A control flow and/or data flow problem is identified in verification when the two basic blocks 1501, 1502, push different argument types onto the stack, and then jump to the same target basic block 1503.

For example, assume that one of the basic blocks pushes a null pointer onto the stack, and that the target basic block needs a pointer to a foo class. In one embodiment, this is consistent, because a null pointer can be a pointer to a foo class. So the null pointer is not inconsistent with the stack state required by the target basic block. Later, another basic block pushes a foo class onto the stack and then jumps to the target basic block. The verifier will attempt to try to come up with a stack state that is consistent for the two basic blocks and the target basic block. In this case, since a foo is consistent with all three blocks, the stack is merged. So both the first basic block 1501 and the second basic block 1502 are allowed to jump to the target basic block 1503 in the output stream.

Figure 16:
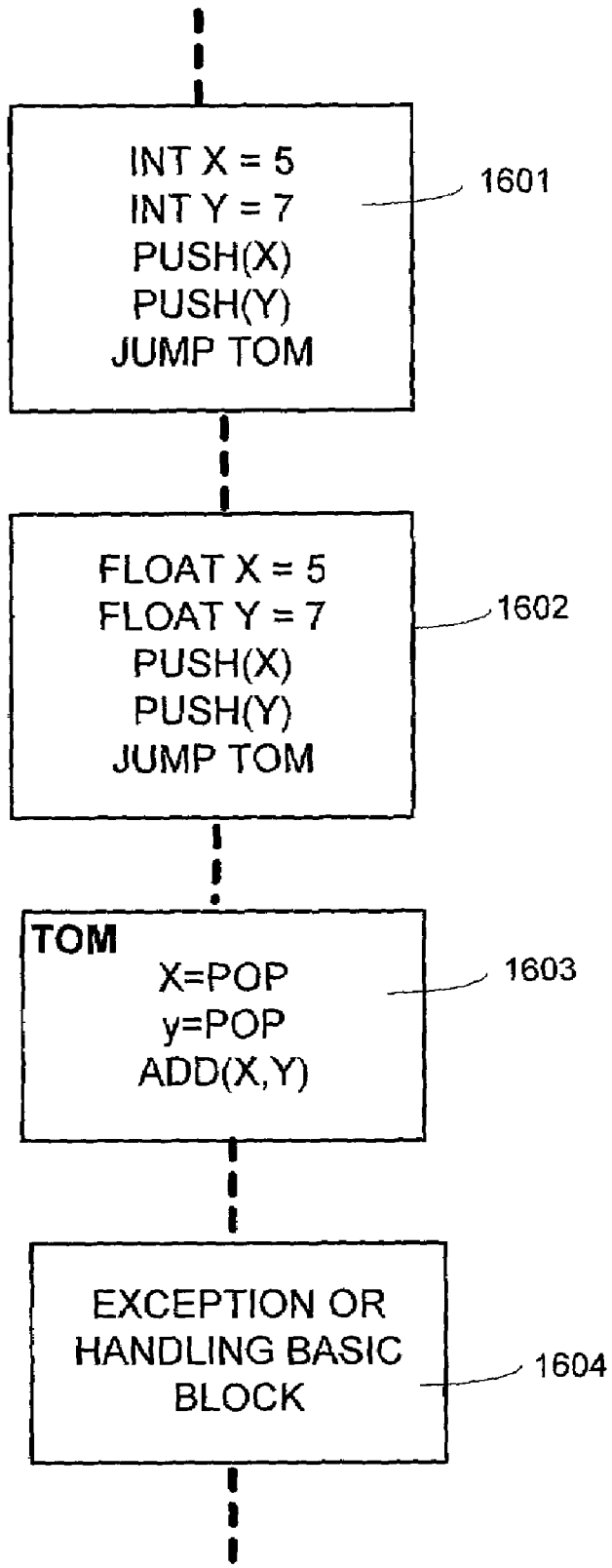
FIG. 16 is a diagram depicting operands pushed onto the stack before jumping to a target block.

In another case, two basic blocks jump to the same basic block that does an add operation. As shown in FIG. 16, each pushes different operands onto the stack. The first basic block 1601 pushes two integers onto the stack before jumping to the basic block 1603 containing the add operation. The second basic block 1602 pushes two floats onto the stack before jumping to the basic block 1603 containing the add operation. That is illegal. It violates a rule of the illustrated embodiment, that the types that are pushed onto the stack for a target basic block are the same independent of the path that you took to get there. The fact that you pushed two integers before jumping from one path, and you pushed two integers before jumping from the other path, violates this rule. Alone either is fine. It is okay to add two integers, and it is okay to add two floats, but it is not okay to merge these two execution paths given this rule.

In the illustrated embodiment, the first path encountered by the verifier (from the first basic block 1601 to the target basic block 1603) would be allowed, and the second execution path (from the second basic block 1602 to the target basic block 1603) would be directed to an inserted exception throwing and/or handling instruction(s) 1604 in the output stream. This failure was encountered in the control flow and/or data flow as opposed to any individual offending instruction. In the illustrated embodiment, it is the order (first come first serve) that determines which jump is allowed and which jump is to a newly inserted exception-throwing and/or handling instruction(s).

In addition to placing exception-throwing and/or handling instructions in place of (in front of, or within) a basic block containing unresolvable translation errors, a translator looks at the state of the stack when traversing the input stream. In such a case, one execution path to a given basic block may not be acceptable, but another may be allowed. So even after the particular instructions in the input stream have been determined to be resolvable individually, the program control flow, data flow, and/or logic may create additional unresolvable translation errors.

The translator is attempting to make sure that only verified code ends up in the output stream. This can be accomplished by inserting exception-throwing and/or handling instruction(s) into (i) the basic block jumping to a target basic block, (ii) into the target basic block, or (iii) into a new basic block inserted into the output stream. Any of these will achieve the effect—insuring only verified code runs. However, inserting a new basic block containing the inserted exception-throwing and/or handling instruction(s) and directing the jump to that location seems to reject the fewest programs. It leaves both the originating basic block and the target basic block free to interact with other basic blocks for other verifiable execution paths. As previously discussed, trusted code is inserted in the output stream without an inserted exception throwing and/or handling instructions(s).

Although one skilled in art would realize the significance for all sub-units of translation (FIG. 3), it is interesting to note code verification. With this approach to verification, you can limit the exception-throwing and/or handling instruction(s) to executions paths that can not be verified. The exception-throwing and/or handling instruction(s) are only necessary for specific execution paths. The illustrated embodiment, only inserts exception-throwing and/or handling instruction(s) for specific code paths, as opposed to failing large chunks or the entire program because of a few control flow and/or data flow paths that may not be verifiable.

Further, even when an exception-throwing and/or handling instruction(s) are inserted in the output stream, the handling instruction(s) and/or the runtime environment may try to re-translate the failed translation one more time before giving up. See above "Re-translation Attempt at Runtime" and see above "Exception Handler Methods." A code verifier may not be able to resolve a situation during compilation. If a rule is not then verifiable, it may become verifiable later when it is needed for execution. In such a case, something needed from a disk or the network may be available. This can be accomplished by re-translation and/or by inserting handling instruction(s) in the output stream. When the code is actually needed by a client, conditions may have changed. If a handler and/or re-translation attempt determines that a failure condition no longer exists, then this form of lazy and/or late failure may provide a final success. This situation is germane to verification.

It happens in the context of verification because new classes and/or resources may become available or may otherwise be time/case dependent. An input stream may refer to something that is unavailable when the code is compiled (JIT or otherwise), and normally that would cause a verification exception. But with the illustrated embodiment, through re-translation and/or when an inserted handler runs, those resources may then be available.

Finally, it will be apparent to one of ordinary skill in the art in view of the foregoing discussion, that in all cases of encountering unresolvable translation errors, (not just in code verification or unresolvable instructions), the inserted exception-throwing and/or handling instruction(s) may be inserted into a new basic block in the output stream with control flow adjusted to direct unresolvable translation errors thereto. Further, such inserted instructions may also be inserted in front of, or instead of any unresolvable translation errors as discussed in this Specification (e.g., "Identifying Areas of Code Blocked by Exception Throwing Instructions").

Exemplary Operating Environment

Figure 17:
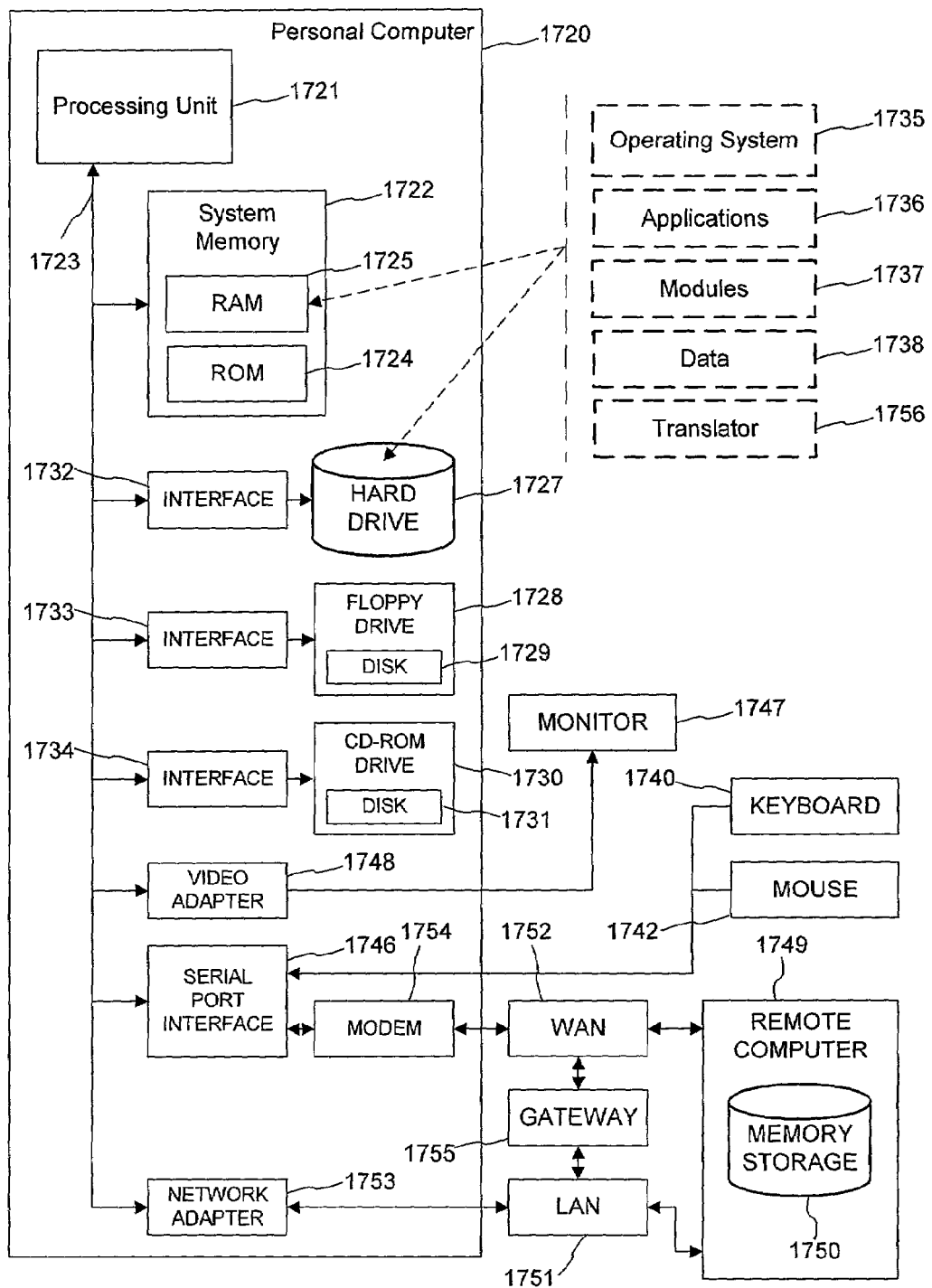
FIG. 17 is a block diagram of a distributed computer system implementing a method and apparatus embodying the invention.

FIG. 17 and the following discussion are intended to provide a brief, general description of a suitable computing environment in which the invention may be implemented. While the invention will be described in the general context of computer executable instructions of a computer program that runs on a computer and/or computer printer, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including hand-held devices, multiprocessor systems, microprocessor-based or programmable consumer electronics, minicomputers, mainframe computers, and the like. The illustrated embodiments of the invention also can be practiced in networked computing environments, or on stand-alone computers.

Further, the illustrated embodiment of the invention may be practiced on all the following either alone or in a network environment (wireless or not): portable computing devices, electronic organizers, electronic day planners, electronic devices with screens, devices connected to screens, devices connected to printers, cell phones with miniature browsers, textual pagers, hand-held inventory devices, vehicles containing onboard devices with displays, or devices of any kind that render text or character for display or printing.

With reference to FIG. 17, an exemplary system for implementing the invention includes a conventional computer 1720 (such as personal computers, laptops, palmtops or handheld-PCs, set-tops, servers, mainframes, and other variety computers) includes a processing unit 1721, a system memory 1722, and a system bus 1723 that couples various system components including the system memory to the processing unit 1721. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1721.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1724 and random access memory (RAM) 1725. A basic input/output system (BIOS), containing the basic routines that help to transfer information between elements within the computer 1720, such as during start-up, is stored in ROM 1724.

The computer 1720 further includes a hard disk drive 1727, a magnetic disk drive 1728, e.g., to read from or write to a removable disk 1729, and an optical disk drive 1730, e.g., for reading a CD-ROM disk 1731 or to read from or write to other optical media. The hard disk drive 1727, magnetic disk drive 1728, and optical disk drive 1730 are connected to the system bus 1723 by a hard disk drive interface 1732, a magnetic disk drive interface 1733, and an optical drive interface 1734, respectively. The drives and their associated computer-readable media provide nonvolatile storage of data, data structures, computer-executable instructions, etc. for the computer 1720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1725, including an operating system 1735, one or more application programs 1736, other program modules 1737, and program data 1738; in addition to an embodiment 1756.

A user may enter commands and information into the computer 1720 through a keyboard 1740 and pointing device, such as a mouse 1742. Other input devices (not shown) may include a microphone, joystick, game pad, satellite dish, scanner, or the like. These and other input devices are often connected to the processing unit 1721 through a serial port interface 1746 that is coupled to the system bus, but may be connected by other interfaces, such as a parallel port, game port or a universal serial bus (USB). A monitor 1747 or other type of display device is also connected to the system bus 1723 via an interface, such as a video adapter 1748. In addition to the monitor, computers typically include other peripheral output devices (not shown), such as speakers and printers.

The computer 1720 operates in a networked environment using logical connections to one or more remote computers, such as a remote computer 1749. The remote computer 1749 may be a server, a router, a peer device or other common network node, and typically includes many or all of the elements described relative to the computer 1720, although only a memory storage device 1750 has been illustrated. The logical connections depicted include a local area network (LAN) 1751 and a wide area network (WAN) 1752. Such networking environments are commonplace in offices, enterprise-wide computer networks, intranets and the Internet.

When used in a LAN networking environment, the computer 1720 is connected to the local network 1751 through a network interface or adapter 1753. When used in a WAN networking environment, the computer 1720 typically includes a modem 1754 or other means for establishing communications (e.g., via the LAN 1751 and a gateway or proxy server 1755) over the wide area network 1752, such as the Internet. The modem 1754, which may be internal or external, is connected to the system bus 1723 via the serial port interface 1746. In a networked environment, program modules depicted relative to the computer 1720, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 1720, unless indicated otherwise. Such acts and operations are sometimes referred to as being computer-executed. It will be appreciated that the acts and symbolically represented operations include the manipulation by the processing unit 1721 of electrical signals representing data bits which causes a resulting transformation or reduction of the electrical signal representation, and the maintenance of data bits at memory locations in the memory system (including the system memory 1722, hard drive 1727, floppy disks 1729, and CD-ROM 1731) to thereby reconfigure or otherwise alter the computer system's operation, as well as other processing of signals. The memory locations where data bits are maintained are physical locations that have particular electrical, magnetic, or optical properties corresponding to the data bits. In the illustrated computer system, an illustrated embodiment of the invention is depicted 1756.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus or software, unless indicated otherwise. Various types of general purpose or specialized computer apparatus may be used with or perform operations in accordance with the teachings described herein. Elements of the illustrated embodiment shown in software may be implemented in hardware and vice versa.

Further, although illustrated as implemented in a personal computer, the invention can be practiced in other digital computing appliances whether networked or not.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of translating computer program code from a first language representation into a second language representation, the method comprising:

translating translatable instructions of an input stream in a first language representation into an output stream in a second language representation;

identifying an unresolvable code in the input stream wherein a translator is unable to translate the unresolvable code from a first language representation into a second language representation; and placing at least one second language representation instruction in the output stream responsive to identifying the unresolvable code in the input stream;

wherein the placed at least one second language representation instruction is at least one of either a handling instruction or an exception throwing instruction.

2. The method of claim 1 wherein said placing comprises placing the at least one second language representation instruction in a location in the output stream where the unresolvable code in the input stream would have been placed in the output stream had the unresolvable code been a translatable instruction.

3. The method of claim 1 wherein said placing comprises placing the at least one second language representation instruction in a location in the output stream where a method containing the unresolvable code in the input stream would have been placed in the output stream had the entire method been translatable.

4. The method of claim 1 wherein said placing comprises placing the at least one second language representation instruction in a location in the output stream where a basic block containing the unresolvable code in the input stream would have been placed in the output stream had the entire basic block been translatable.

5. A method of executing the output stream of claim 1, the method comprising:

executing at least one translated instruction and at least one placed second language representation instruction.

6. The method of claim 5, wherein the presently executing instruction is the at least one placed second language representation instruction, the method further comprising:

requesting by the presently executing at least one placed second language representation instruction, the request being made to a server for instructions external to the output stream.

7. The method of claim 1, wherein said placing further comprises:

directing the placement of the at least one second language representation instruction within the output stream based on a declarative textual indication contained in the input stream.

8. The method of claim 7, wherein the declarative textual indication designates that the at least one second language representation instruction replace an unresolvable code.

9. The method of claim 7, wherein the declarative textual indication designates that the at least one second language representation instruction replace a basic block containing an unresolvable code.

10. The method of claim 7, wherein the declarative textual indication designates that the at least one second language representation instruction replace a method containing an unresolvable code.

11. The method of claim 7, wherein the declarative textual indication designates that the at least one second language representation instruction should be inserted in a new basic block.

12. The method of claim 1, wherein said placing comprises placing both:

at least one exception throwing instruction; and at least one handling instruction.

13. A method of executing the output stream of claim 12, the method comprising:
executing the placed handling instruction subsequent to executing the placed exception throwing instruction.

14. The method of claim 1, further comprising:
determining from a declarative textual indication in the input stream which at least one second language representation instruction to place in the output stream.

15. The method of claim 1, further comprising:
obtaining from a library of available at least one second language representation instruction, the at least one second language representation instruction placed in the output stream.

16. The method of claim 1, further comprising:
wherein the at least one of either a handling instruction or an exception throwing instruction, is an application programming interface instruction to a dynamically linkable library.

17. The method of claim 1, further comprising:
determining a level to place the at least one second language representation instruction;
wherein the determination of level to place the at least one second language representation instruction is made from among a set of available levels, the set of available levels including at least two distinct levels from a group of potential levels, the group of potential levels comprising a method level, an instruction level, a basic block level, and a program level.

18. The method of claim 17, wherein a declarative textual indication indicates the level to place the at least one second language representation instruction.

19. A computer readable medium comprising translated code produced by a computer performing a method comprising claim 1.

20. The method of claim 1, further comprising:
placing in the output stream an unaltered copy of the identified unresolvable code.

21. A method of executing the output stream of claim 20, the method comprising:
executing the placed at least one second language representation instruction, said executing invoking a translator on the unaltered copy of the identified unresolvable code from the output stream, thereby causing the invoked translator to attempt to translate the unaltered copy of the unresolvable code into a second language representation instruction, and if the unaltered copy of the identified unresolvable code is then translatable into a second language representation instruction, then the second language representation instruction is executed.

22. The method of claim 1 wherein said placing comprises placing the at least one second language representation instruction in a new basic block in the output stream.

23. A method of translating computer program code from an input stream in a first language representation into an output stream in a second language representation, and the input stream may or may not be from a trusted source, the method comprising:
translating translatable instructions of the input stream into the output stream;
identifying suspected code and unresolvable code in the input stream;
upon determining by a translator, that the unresolvable code in the input stream cannot be translated from a first language representation into a second language representation, placing at least one second language representation instruction in the output stream responsive to identifying the unresolvable code in the input stream in the first language representation wherein the placed at least one second language representation instruction is at least one of a handling instruction or an exception throwing instruction;
determining that the input stream is from a trusted source; and
translating the suspected code in the input stream into the output stream.

24. The method of claim 23, wherein a declarative textual indication in the input stream is used to determine whether the input stream is from a trusted source.

25. The method of claim 23, wherein the determining further comprises:
making a request to a server; and
determining from a server response whether the input stream is from a trusted source.

26. A method of translating computer program code from an input stream in a first language representation into an output stream in a second language representation, the input stream comprising declarative textual indications, the method comprising:
translating translatable instructions in the input stream into the output stream;
identifying an unresolvable instruction in the input stream wherein a translator is unable to translate the unresolvable instruction from a first language representation into a second language representation;
placing at least one second language representation instruction in the output stream responsive to identifying the unresolvable instruction in the input stream wherein the placed at least one second language representation instruction is at least one of a handling instruction or an exception throwing instruction;
identifying a first language representation of a declarative textual indication in the input stream, the declarative textual indication indicating how to handle an unresolvable instruction encountered in the input stream;
translating the first language representation of the declarative textual indication in the input stream into the second language representation of the declarative textual indications in the output stream; and
whereby the second language representations of the declarative textual indications are available to a next phase of translation, the next phase of translation able to use the second language representation of the declarative textual indication as a resource for determining how to handle an unresolvable instruction encountered by the next phase of translation as the next phase translates the output stream into a third language representation.

27. A method of translating the output stream of claim 26 into a third language output stream, the method comprising:
translating translatable instructions of the output stream into the third language output stream;
identifying an unresolvable instruction in the output stream and determining that a translator is unable to translate the unresolvable instruction;
determining an indicated third language representation instruction from a declarative textual indication in the output stream; and
placing the indicated third language representation instruction in the third language output stream responsive to identifying the unresolvable instruction in the output stream.

28. A method of translating computer program code from an input stream in a first language into an output stream in a second language, the method of translating including multiple sub-units of translation, the method comprising:

translating translatable portions of the input stream into the output stream;

identifying a suspected code in the input stream, determining by a security sub-unit of translation based on a declarative textual indication in the input stream that the input stream is from a trusted source, and translating the suspected code into the output stream;

identifying a first unresolvable instruction in a first method in the input stream of the first language wherein one or more sub-units of translation are unable to translate the first unresolvable instruction into the output stream in the second language, determining by a basic block identification sub-unit of translation, that a second language instruction inserted in the output stream in place of the first unresolvable instruction can not be safely segregated within a determinable basic block within the first method in the output stream, and invoking a method level exception throwing instruction insertion sub-unit of translation to insert an exception throwing instruction in the output stream, and invoking a handler data structure insertion sub-unit of translation to insert a handler data structure in the output stream; and identifying a second unresolvable instruction in a second method in the input stream of the first language wherein one or more sub-units of translation are unable to translate the second unresolvable instruction into the output stream in the second language, determining by the basic block identification sub-unit of translation, that a second language instruction inserted in the output stream in place of the second unresolvable instruction can be safely segregated within a determinable basic block within the second method in the output stream, and invoking a basic block level exception throwing instruction insertion sub-unit of translation to insert an exception throwing instruction in the output stream, and invoking the handler data structure insertion sub-unit of translation to insert a handler data structure in the output stream.

29. In a computer readable medium, instructions operational to translate a first language input stream into a second language output stream, the instructions comprising:

instruction(s) for translating translatable portions of a first language input stream into a second language output stream;

instruction(s) identifying an unresolvable instruction in the first language input stream wherein an unresolvable instruction is an instruction a translator is unable to translate from a first language representation into a second language representation; and instruction(s) placing an exception throwing instruction in the second language output stream in response to identifying the unresolvable instruction in the first language input stream.

30. The computer readable medium of claim 29, wherein the first language input stream further comprises a declarative textual indication indicating where in the output stream to place the exception throwing instruction.

31. In a computer readable medium, instructions operational to translate a first language input stream into a second language output stream, the instructions comprising:

instruction(s) translating translatable portions of a first language input stream into a second language output stream;

instruction(s) identifying suspected code and an unresolvable code in the first language input stream wherein instructions translating translatable portions of the first language input stream are unable to translate the unresolvable code into the second language output stream;

instruction(s) placing an exception throwing instruction in the second language output stream in response to identifying the unresolvable code in the first language input stream;

instruction(s) determining the source of the first language input stream; and instructions(s) translating the suspected code into the second language output stream in response to determining that the first language input stream is from a trusted source.

32. In a computer readable medium, instructions operational to translate a first language input stream into a second language output stream, the instructions comprising:

instruction(s) for translating translatable portions of a first language input stream into a second language output stream;

instruction(s) identifying an untranslatable instruction in the first language input stream; and instruction(s) placing a handling instruction in the second language output stream in response to identifying the untranslatable instruction in the first language input stream wherein an untranslatable instruction is an instruction in a first language input stream that a translator is unable to translate into an instruction in a second language output stream.

33. The computer readable medium of claim 32, wherein the first language input stream further comprises a declarative textual indication indicating where in the output stream to place the handling instruction.

34. In a computer system having a user input device, a first language input stream, an operating system, a translation system operating under control of the operating system, the system comprising:

a translation process operating under control of the operating system, and translating the first language input stream into a second language output stream subsequent to a user input on the user input device;

a translation sub-unit operational to perform some portion of the translation process; and a translation sub-unit operational to determine that code identified in the first language input stream can not be translated from a first language into a second language, and responsive to the determination, inserting an exception throwing instruction in the second language output stream.

35. In a computer system having a user input device, a first language input stream, an operating system, a translation system operating under control of the operating system, the system comprising:

a translation process operating under control of the operating system, and translating the first language input stream into a second language output stream subsequent to a user input on the user input device;

a translation sub-unit operational to insert a handling instruction in the second language output stream wherein the handling instruction is inserted in the second language output stream subsequent to a translation sub-unit being unable to translate unresolvable code encountered in the first language input stream into code in the second language output stream; and a translation sub-unit operational to verify that a source of the first language input stream is a trusted source, and translating a suspected code encountered in the first language input stream into a translated code in the second language output stream upon verifying that the source of the first language input stream is a trusted source.

36. In a computer system having a user input device, a first language input stream, an operating system, a translation system operating under control of the operating system, the system comprising:

a translation process operating under control of the operating system, and translating the first language input stream into a second language output stream subsequent to a user input on the user input device;

a translation sub-unit operational to perform some portion of the translation process; and a translation sub-unit operational to determine that an instruction encountered in the first language input stream cannot be translated into the second language output stream, and in response to the determination, inserting a handling instruction in the second language output stream.

37. A method of delaying identification of compile time errors until run time, the method comprising:

compiling a first file containing a first language representation of a computer program into a second file containing a second language representation of the computer program;

identifying an instruction in the first file that a compiler is unable to translate into a second language representation;

determining where the identified instruction in the first file would be placed in the second file by the compiler if the identified instruction were translatable; and inserting a second language representation of an exception throwing instruction into the second file near where the identified instruction would have been placed in the second file by the compiler if the instruction were translatable.

* * * * *

UNITED STATES PATENT AND TRADEMARK OFFICE
CERTIFICATE OF CORRECTION

PATENT NO. : 6,993,751 B2
APPLICATION NO. : 09/855239
DATED : January 31, 2006
INVENTOR(S) : Sanjay Bhansali et al.

It is certified that error appears in the above-identified patent and that said Letters Patent is hereby corrected as shown below:

On the face page, in field (56), under "Other Publications", in column 2, line 8, after "R." insert -- , --.

On page 2, in field (56), under "Other Publications", in column 2, line 3, delete "Desigh" and insert -- Design --, therefor.

In column 1, line 34, after "Compilers" insert -- . --.

In column 8, line(s) 45-46, delete "exception throwing" and insert -- exception-throwing --, therefor.

In column 9, line 25, delete "unresolveable" and insert -- unresolvable --, therefor.

In column 9, line 45, delete "exception throwing" and insert -- exception-throwing --, therefor.

In column 9, line 65, after "dependency" insert -- . --.

In column 11, line 48, delete "Multithreading" and insert -- Multi-threading --, therefor.

In column 11, line 58, delete "runtime" and insert -- run-time --, therefor.

In column 12, line 20, delete "2o0000" and insert -- 200000 --, therefor.

In column 14, line(s) 16-27, delete "As shown in FIG. 9, the input stream 900, is translated into an output stream 907, in a series of five translation sub-units 902-906. (A translation process is an aggregate manifestation of one or more sub-units of translation. See above "Unresolvable Translation Errors.") During translation, if unresolvable code is encountered, an identifying translation sub-unit calls upon an exception-throwing instruction insertion module (sub-unit) to generate an exception throwing instruction in an indicated position 908-909. It shall be understood that these insertion modules 908-909 can inserted exception-throwing and/or handling instructions in the output stream." and insert -- As shown in FIG. 9, the input stream 900, is translated into an output stream 907, in a series of five translation sub-units 902-906. (A translation process is an aggregate manifestation of one or more sub-units of translation. See above "Unresolvable Translation Errors.") During translation, if unresolvable code is encountered, an identifying translation sub-unit calls upon an exception-throwing instruction insertion module (sub-unit) to generate an exception throwing instruction in an indicated position 908-909. It shall be understood that these insertion modules 908-909 can inserted exception-throwing and/or handling instructions in the output stream. --, therefor on line 15 as a continuation of paragraph.

UNITED STATES PATENT AND TRADEMARK OFFICE
CERTIFICATE OF CORRECTION

PATENT NO. : 6,993,751 B2
APPLICATION NO. : 09/855239
DATED : January 31, 2006
INVENTOR(S) : Sanjay Bhansali et al.

It is certified that error appears in the above-identified patent and that said Letters Patent is hereby corrected as shown below:

In column 20, line 51, delete "catchg" and insert -- catching --, therefor.

In column 21, line 60, delete "instructions(s)" and insert -- instruction(s) --, therefor.

In column 22, line 21, delete "et." and insert -- etc. --, therefor.

In column 24, line 33, after "verification" delete "one".

In column 26, line 53, delete "instructions(s)" and insert -- instruction(s) --, therefor.

In column 27, line 34, delete "Exception Throwing" and insert -- Exception-Throwing --, therefor.

In column 27, line 42, delete "computer executable" and insert -- computer-executable --, therefor.

In column 34, line 13, in Claim 31, delete "instructions(s)" and insert -- instruction(s) --, therefor.

Signed and Sealed this

Twenty-fifth Day of August, 2009

David J. Kappos
*Director of the United States Patent and Trademark Office*